United States Patent
Moore et al.

(10) Patent No.: US 9,047,208 B1
(45) Date of Patent: Jun. 2, 2015

(54) METHOD AND SYSTEM OF CONFIGURING VIRTUAL FUNCTION IN PERIPHERAL DEVICES

(71) Applicant: QLOGIC, Corporation, Aliso Viejo, CA (US)

(72) Inventors: Richard S. Moore, Irvine, CA (US); Bradley S. Sonksen, Rancho Santa Margarita, CA (US); Andrew Broughton, San Clemente, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 0 days.

(21) Appl. No.: 14/100,856

(22) Filed: Dec. 9, 2013

Related U.S. Application Data

(60) Provisional application No. 61/735,498, filed on Dec. 10, 2012.

(51) Int. Cl.
  *G06F 9/455* (2006.01)
  *G06F 13/10* (2006.01)
  *G06F 13/24* (2006.01)

(52) U.S. Cl.
  CPC .............. *G06F 13/102* (2013.01); *G06F 13/24* (2013.01); *G06F 9/45533* (2013.01); *G06F 9/45558* (2013.01); *G06F 2009/45579* (2013.01)

(58) Field of Classification Search
  None
  See application file for complete search history.

(56) References Cited

U.S. PATENT DOCUMENTS

| | | | | |
|---|---|---|---|---|
| 7,743,189 B2 * | 6/2010 | Brown et al. | ............... | 710/104 |
| 7,904,914 B2 * | 3/2011 | Green et al. | ............... | 719/321 |
| 7,945,436 B2 * | 5/2011 | Ang et al. | ............... | 703/23 |
| 7,979,592 B1 * | 7/2011 | Pettey et al. | ............... | 710/3 |
| 8,065,454 B1 * | 11/2011 | Sonksen et al. | ............... | 710/72 |
| 8,156,253 B2 * | 4/2012 | Watanabe | ............... | 710/8 |
| 8,225,334 B2 * | 7/2012 | Green et al. | ............... | 719/321 |
| 8,239,655 B2 * | 8/2012 | Goggin et al. | ............... | 711/203 |
| 8,271,707 B2 * | 9/2012 | Fan et al. | ............... | 710/104 |
| 8,375,148 B2 * | 2/2013 | Watanabe | ............... | 710/8 |
| 8,473,947 B2 * | 6/2013 | Goggin et al. | ............... | 718/1 |
| 8,521,941 B2 * | 8/2013 | Regula | ............... | 710/313 |
| 8,645,605 B2 * | 2/2014 | Subramaniyan et al. | ..... | 710/313 |
| 8,756,689 B2 * | 6/2014 | Jani et al. | ............... | 726/22 |
| 2008/0147898 A1 * | 6/2008 | Freimuth et al. | ............... | 710/8 |
| 2009/0119087 A1 * | 5/2009 | Ang et al. | ............... | 703/23 |
| 2009/0133016 A1 * | 5/2009 | Brown et al. | ............... | 718/1 |
| 2009/0133028 A1 * | 5/2009 | Brown et al. | ............... | 718/104 |
| 2009/0144731 A1 * | 6/2009 | Brown et al. | ............... | 718/1 |

(Continued)

OTHER PUBLICATIONS

'High Performance and Scalable I/O Virtualization via Self-Virtualized Devices' by Himanshu Raj and Karsten Schwan, copyright 2007 ACM.*

(Continued)

*Primary Examiner* — Steven Snyder
(74) *Attorney, Agent, or Firm* — Klein, O'Neill & Singh, LLP

(57) ABSTRACT

Methods and systems for a device are provided. The device includes physical function (PF) representing a physical component and is assigned to an XF group. The XF group includes a plurality of virtual functions (VFs) associated with the PF, each VF identified by a unique number. A number of XF group that are assigned to the PF is configurable depending on the function of the physical component.

10 Claims, 15 Drawing Sheets

(56) References Cited

U.S. PATENT DOCUMENTS

| | | | |
|---|---|---|---|
| 2009/0248947 A1* | 10/2009 | Malwankar et al. | 710/316 |
| 2009/0276775 A1* | 11/2009 | Brown et al. | 718/100 |
| 2010/0083276 A1* | 4/2010 | Green et al. | 719/313 |
| 2012/0102491 A1* | 4/2012 | Maharana | 718/1 |
| 2012/0131590 A1* | 5/2012 | Brownlow et al. | 718/104 |
| 2012/0167085 A1* | 6/2012 | Subramaniyan et al. | 718/1 |
| 2012/0185618 A1* | 7/2012 | Assarpour | 710/15 |
| 2012/0185632 A1* | 7/2012 | Lais et al. | 710/308 |
| 2012/0284437 A1* | 11/2012 | Ayzenfeld et al. | 710/104 |
| 2012/0297379 A1* | 11/2012 | Anderson et al. | 718/1 |
| 2013/0097598 A1* | 4/2013 | Schroeder et al. | 718/1 |
| 2013/0322335 A1* | 12/2013 | Smith | 370/328 |
| 2014/0173600 A1* | 6/2014 | Ramakrishnan Nair | 718/1 |
| 2014/0173628 A1* | 6/2014 | Ramakrishnan Nair | 718/108 |
| 2014/0189690 A1* | 7/2014 | Ramakrishnan Nair | 718/1 |
| 2014/0208317 A1* | 7/2014 | Nakagawa | 718/1 |

OTHER PUBLICATIONS

'Standardized but Flexible I/O for Self-Virtualizing Devices' by Joshua LeVasseur et al., WIOV'08 Proceedings of the First conference on I/O virtualization, USENIX Association Berkeley, CA, USA copyright 2008.*

* cited by examiner

METHOD AND SYSTEM OF CONFIGURING VIRTUAL FUNCTION IN PERIPHERAL DEVICES

CROSS REFERENCE TO RELATED APPLICATIONS

This patent application claims the benefit under 35 U.S.C. §119(e) of U.S. Provisional Application Ser. No. 61/735, 498, filed on Dec. 10, 2012, the disclosure of which is incorporated herein in its entirety.

TECHNICAL FIELD

The present invention relates to using physical and virtual functions in peripheral devices.

BACKGROUND

Computing systems are commonly used today. A computing system often communicates with a peripheral device (for example, a host bus adapter, a network interface card, a converged network adapter or any other device type) for performing certain functions, for example, reading and writing information. Continuous efforts are being made to improve communication between computing systems and peripheral devices.

BRIEF DESCRIPTION OF THE DRAWINGS

The various present embodiments will be discussed in detail with an emphasis on highlighting the advantageous features. These novel and non-obvious embodiments are depicted in the accompanying drawings, which are for illustrative purposes only. These drawings include the following figures, in which like numerals indicate like parts.

DETAILED DESCRIPTION

Figure 1A:
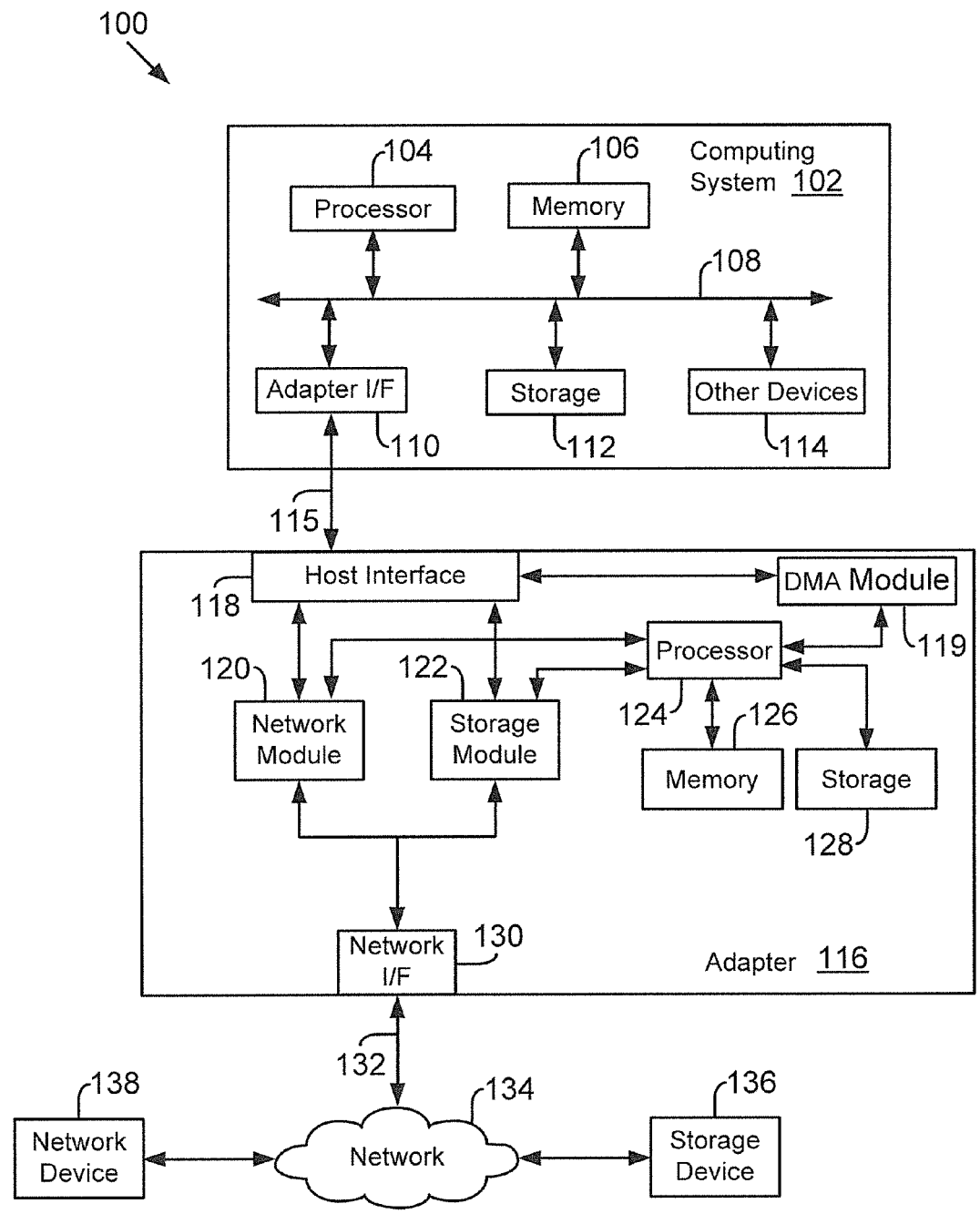
FIG. 1A is a functional block diagram of a system, used according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using computer executable software instructions, firmware code, hardware (e.g., fixed logic circuitry), or a combination of these embodiments. The terms "logic", "module", "component", "system", and "functionality", as used herein, generally represent software, firmware, hardware, or a combination of these elements. For instance, in the case of a software embodiment, the terms "logic", "module", "component", "system", and "functionality" represent program code that performs specified tasks when executed on a hardware processing device or devices (e.g., a micro-processor). The program code can be stored in one or more non-transitory computer readable memory devices accessible to the hardware processing device.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.). The embodiments disclosed herein, may be implemented as a computer process (method), a computing system, or as an article of manufacture, such as a computer program product or computer-readable media. The computer program product may be non-transitory computer storage media, readable by a hardware component, and encoding a computer program of instructions for executing a computer process.

FIG. 1A is a block diagram of a system 100 configured for use with the present embodiments. The system 100 may include one or more computing system 102 (may also be referred to as "host system 102" or server 102) coupled to another device via a link 115, for example, an adapter 116 that interfaces with a network 134 via a network link 132. The term device and adapter 116 are used interchangeably throughout this disclosure. The network 134 may include, for example, additional computing systems, servers, storage systems and other devices. It is noteworthy that although the description below is based on the interaction between adapter 116 and host system 102, the embodiments disclosed herein are not limited to any particular device type.

The computing system 102 may include one or more processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. Processor 104 executes computer-executable process steps and interfaces with an interconnect (or computer bus) 108. The computer bus 108 may be, for example, a system bus, a Peripheral Component Interconnect (PCI) bus (or PCI-Express (also referred to as PCIe) bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

An adapter interface 110 interfaces with the adapter 116 via the link 115 for sending and receiving information. Link 115 may be an interconnect system, for example, a PCI-Express bus or any other interconnect type. The computing system 102 also includes other devices and interfaces 114, which may include a display device interface, a keyboard interface, a pointing device interface, etc. Details regarding the other devices 114 are not germane to the embodiments disclosed herein.

The computing system 102 may further include a storage device 112, which may be for example a hard disk, a CD-ROM, a non-volatile memory device (flash or memory stick) or any other mass storage device. Storage 112 may store operating system program files, application program files, and other files. Some of these files are stored on storage 1.12 using an installation program. For example, the processor 104 may execute computer-executable process steps of an installation program so that the processor 104 can properly execute the application program.

Memory 106 interfaces to the computer bus 108 to provide processor 104 with access to memory storage. Memory 106 may include random access main memory (RAM). When executing stored computer-executable process steps from storage 112, the processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1A, link 115 and adapter interface 110 couple adapter 116 to computing system 102. Adapter 116 may be configured to handle both network and storage traffic. Various network and storage protocols may be used to handle network and storage traffic, for example, Ethernet, Fibre Channel, Fiber Channel over Ethernet, iSCSI and others.

Adapter 116 interfaces with computing system 102 via link 115 and a host interface 118. In one embodiment, host interface 118 may be a PCI Express interface having logic/circuitry for sending and receiving PCI-Express packets described below in detail.

Adapter 116 may also include a processor (or more than one processor) 124 that executes firmware instructions out of a memory 126 to control overall adapter operations. Adapter 116 may also include a storage device 128, which may be for example non-volatile memory, such as flash memory, or any other device. Storage device 128 may store executable instructions and operating parameters that can be used for controlling adapter operations.

Adapter 116 may include a network module 120 for handling network traffic via link 132. In one embodiment, network module 120 includes logic and circuitry for handling network packets, for example, Ethernet or any other type of network packets. Network module 120 may also include memory buffers (not shown) to temporarily store information received from other network devices 138 and transmitted to other network devices 138.

Adapter 116 may also include a storage module 122 for handling storage traffic to and from storage devices 136 via network 134. Storage module 122 may further include memory buffers (not shown) to temporarily store information received from storage devices 136 and transmitted by adapter 116 to storage devices 136. In one embodiment, storage module 122 is configured to process storage traffic according to the Fibre Channel storage protocol, or any other protocol. It is noteworthy that adapter 116 may only have a network module 120 or a storage module 122. The embodiments described herein are not limited to any particular adapter type.

Adapter 116 also includes a network interface 130 that interfaces with link 132 via one or more ports (not shown). Network interface 130 includes logic and circuitry to receive information via network link 132 and pass it to either network module 120 or storage module 122, depending on the packet type.

Adapter 116 also includes a direct memory access (DMA) module 119 that is used to manage access to link 115. DMA module 119 uses a plurality of DMA channels (168A-168N, See FIG. 1C) for transferring data via link 115. The DMA channels are typically used to move control structures such as input/output control blocks (IOCBs), input/output status blocks (IOSBs) and data between host system memory 106 and adapter memory 126.

Figure 1B:
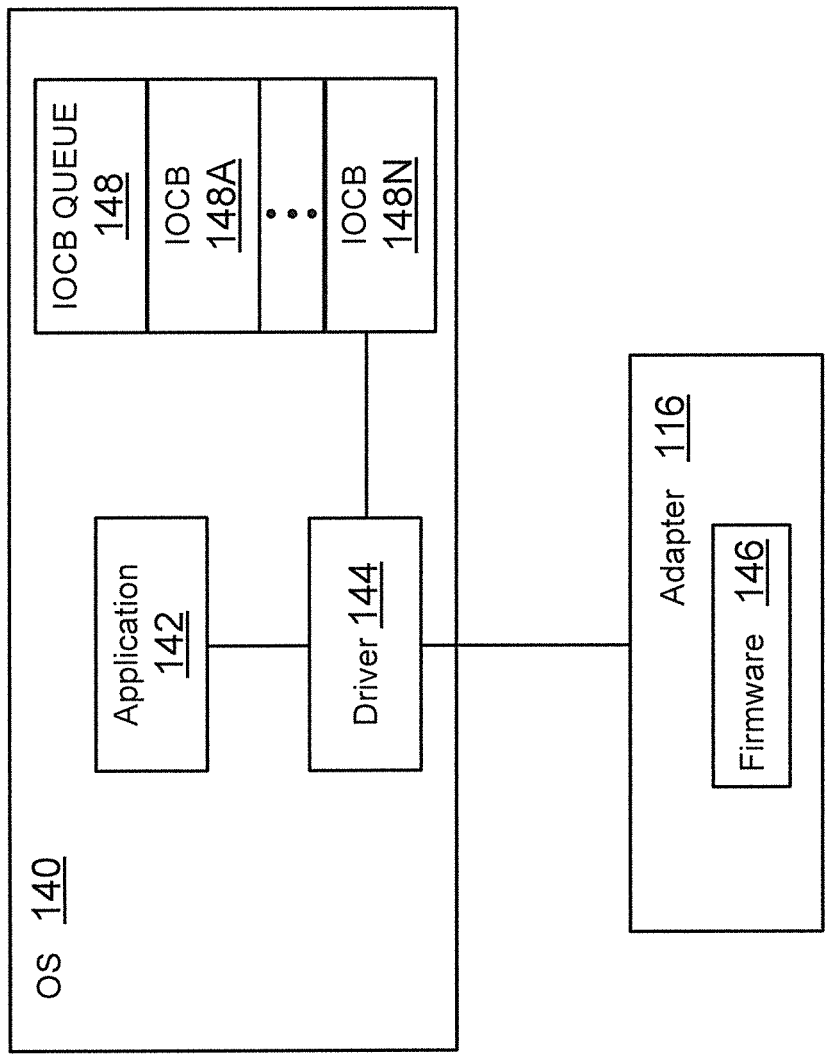
FIG. 1B shows a software architecture used in the system of FIG. 1A.

FIG. 1B shows an example of a generic software architecture used by system 100. Processor 104 executes an operating system 140 for controlling the overall operations of computing system 102. The operating system 140 may be Windows based, Linux operating system, Solaris, or any other operating system type. The embodiments disclosed herein are not limited to any particular operating system type.

An application 142 may be executed by processor 104 for performing certain functions. For example, application 142 may be an email program, a database application or any other application type. Application 142 may send a command (I/O request) to a driver 144 for performing an operation, for example, reading and/or writing data at another storage device. The driver 144 processes the request and communicates with firmware 146 executed by processor 124 of adapter 116. A component of adapter 116 then processes the request.

Typically for managing data transfers across link 115, the following process steps are typically used: an IOCB is first generated by the driver 144 in response to an I/O request and saved at an IOCB queue 148, shown as 148A-148N. The IOCB queue 148 may be at host memory 106 or any other location. The IOCB is obtained by adapter 116 which may be to provide data to host processor 104 or to send data provided by host processor 104. For a write operation, an IOCB typically includes an "address" of host memory 106 where data that needs to be sent is stored and a "length" that indicates the amount of data that needs to be transferred. Both IOCB fetch and data transfer operations are performed using DMA operations via DMA channels. Based on the IOCB, adapter 116 executes the operations that may be needed.

Figure 1C:
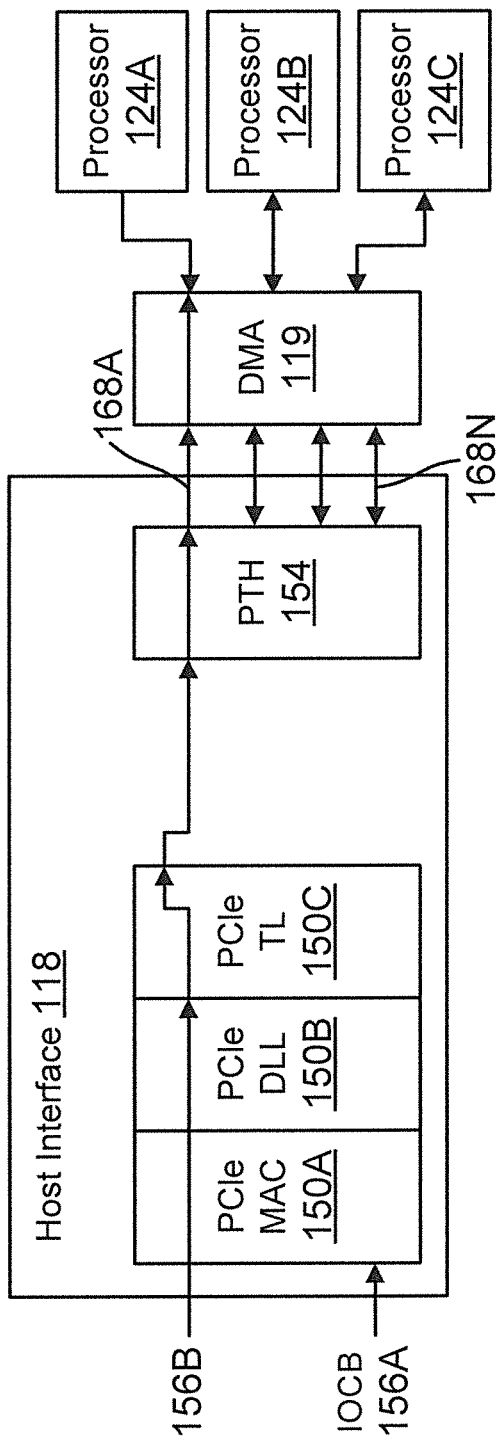
FIG. 1C shows a block diagram of a PCI-Express device communicating with a host system.

Adapter 116 then uses DMA operation to send a status block (IOSB) to processor 104 indicating the completion of IOCB execution and associated data transfer. The adapter 116 then sends an interrupt message to the host processor 104 to indicate completion of IOCB execution and posting of the IOSB status in the host system memory 106 so that it can process IOSBs and notify application 142 of the completion of the data transfer process FIG. 1C shows a system for receiving information from the host 102 via host interface 118, according to one embodiment. The data may be received as PCIe packets, when link 115 is a PCIe link. Host interface 118 may include a PCIe media access control (MAC) layer (also referred to as PHY or PHY layer) 150A for receiving and sending messages via link 115. Host interface 118 may also include a PCIe data link layer (referred to as DLL) 150B between a PCIe transaction layer (referred to as TL) 150C and PHY 150A. PHY 150A, DLL 150B and TL 150C are defined by the PCIe specification.

Host interface 118 also includes a PCI-Express Transaction Handler (PTH) 154 that interfaces with DMA module 119 and TL 150C to send and receive information via link 115. PTH 154 performs various functions including error checking and others.

PCI-Express uses a packet-based protocol to exchange information between TL 150C and another TL (not shown) at the adapter interface 110 at host system 102. Transactions are carried out using requests and completions. Completions are used when required, for example, to return read data or to acknowledge completion of a request. On the transmit side (i.e. packets to processor 104 from adapter 116), packets flow from the TL 150C to PHY 150A. On the receive side (i.e. packets to adapter 116 from processor 104), packets are processed by the PHY layer 150A and sent to TL 150C for processing. TL 150C assembles and disassembles Transaction Layer Packets ("TLPs") that are used to communicate transactions, such as read and write and other type of events.

The system of FIG. 1C shows more than one processor 124 (labeled as 124A-124C) for adapter 116. The embodiments described herein are not limited to any particular number of processors. Processors 124A-124C interface with DMA module 119 to send and receive data and messages via link 115.

As described above, driver 144 generates an IOCB for an I/O request to send data via network link 132 to a destination. The IOCB is placed at the IOCB queue 148. The IOCB (for example, 156A) is then retrieved by adapter 116 and provided to one of the processors, for example, 124A for further processing. Processor 124A then programs a DMA channel (for example, 168A) to obtain data from host memory 106 via path 156B. Once data is received it is transmitted via network link 132 to its destination.

The PCIe standard for Single-Root I/O Virtualization (SR-IOV) allows devices to use a plurality of Virtual Functions (VFs) and interrupt vectors. A VF is associated with a physical function (PF), while an interrupt vector is used to notify an entity (for example, processor 104) of an event. The number of Physical Functions (PFs) of a device, the number of VFs for each PF, and the number of interrupt vectors for each PF or VF depends on the type of PCI-Express device. The number of PFs implemented in a design will be referred to herein as NUM_PFS. PFS, VFs and interrupt vectors use hardware resources and hence add to the area of an application specific integrated circuit (ASIC) of a PCIe device. In one embodiment, a flexible mechanism for configuring allocation of hardware resources based on these variable application requirements is provided.

A PCIe Function (for example, PFs and VFs) typically includes a set of registers defined by a Configuration Space, optional Memory or I/O (input/output) Space, optional DMA channels, and optional interrupt vectors. Configuration Space may be used to store a Configuration Header and various data structures with details regarding capabilities of the functions. Memory and I/O Space are typically mapped to a host system's address space via Base Address Registers (BARs), which are included in a Function's Configuration Header (except for VFs). For VFs, BARs are included in a SR-IOV Capability Structure of an associated PF, and are referred to as VF BARs. A single set of VF BARs is common to all VFs associated with a given PF. Configuration Header and Capability Structures are mapped to a device's PCIe Configuration Space. The contents of Configuration Space are addressable by a combination of a Bus Number (which identifies the PCIe link 115 in a system's PCIe hierarchy, and hence can be used to identify a specific endpoint in that hierarchy), a Function Number, and a Register Number (also known as an address or offset). These resources, except the contents of a target memory space and the mechanisms for controlling DMA operation, are defined by the PCIe standard and associated specifications.

Each PF is associated with a set of VFs, and each VF has a pair of assigned numbers i.e. the Function Number of a managing PF and a VF number which ranges from 1 to a predetermined maximum value (called Total VFs). The (PF, VF) pair is mapped to a linear PCIe Function Number using an algorithm/process described by the SR-IOV standard specification. Reversing the algorithm allows the Function Number of a PCIe transaction to be converted to a PF Number and a VF Number by adapter 116.

PCIe supports three interrupt modes that are referred to as INTx, Message Signaled Interrupts (MSI), and an extension of MSI called MSI-X. INTx is a legacy protocol, and typically is not supported by VFs. MSI-X provides the most flexibility and is a preferred interrupt mode that uses interrupt vectors. An interrupt vector as used by the MSI-X protocol is a data structure that includes an address (pointing to a location in a host system memory space) and a data value. When a PCIe device (for example, adapter 116 or a component of adapter 116, for example, host interface 118) issues a Memory Write transaction to the host system 102 using one of these stored address and data combinations, the host system 102 can identify the associated interrupt vector. The address and data fields are typically stored in a non-volatile memory (for example, 128), which may be either general purpose RAM, or RAM dedicated to interrupt vector storage. Additionally, a Mask bit and a status (Pending) bit are used and may be implemented as flip-flops to allow immediate, real-time processing of hardware events in adapter 116. The collection of Pending bits associated with a single Function are known as a Pending Bit Array (PBA) that is described below. The number of MSI-X vectors associated with a given Function is reported in the Configuration Space, in the Function's MSI-X Capability Structure. The vector address and data fields, Mask bits, and PBA are mapped into the system memory space through one of the BARs (or one of the VF BARs, in the case of VFs) associated with the Function, in a manner prescribed by the PCIe MSI-X specification.

The MSI-X Mask bit is set when it is desired to suppress interrupt message generation for an interrupt vector whenever a Pending bit associated with the same vector is set (i.e. pending). An interrupt vector's Pending bit is cleared when the associated vector is sent to the host 102, and arbitration continues to select a next vector to be sent, until all unmasked Pending bits are clear.

Conventional designs (including those predating the SR-IOV standard) allow the number of PCIe Functions (other than VFs) to be reduced from a design maximum by selectively disabling unneeded Functions. Conventional designs are also capable of mapping Functions to different capabilities of a PCIe device (e.g., a Function may be assigned to either a network interface card (NIC) port or a Fibre Channel port within the device by programming a register). The chosen personality of a Function is typically reflected in a Device Identifier (Id) and Class Id fields in the Function's Configuration Space header.

In conventional systems, each PF may have dedicated VFs. In other conventional designs a large number of VFs are assigned to each PF, even though not every VF is used. Both conventional choices have shortcomings. For example, when VFs are dedicated and hardwired to PFs that limits flexibility in terms of using and configuring PCIe devices. When a large number of VFs are provided to each PF, then that results in complex logic and inefficient use of die space for an ASIC. The embodiments described herein provide an efficient system and process for handling PFs and VFs.

Figure 1D:
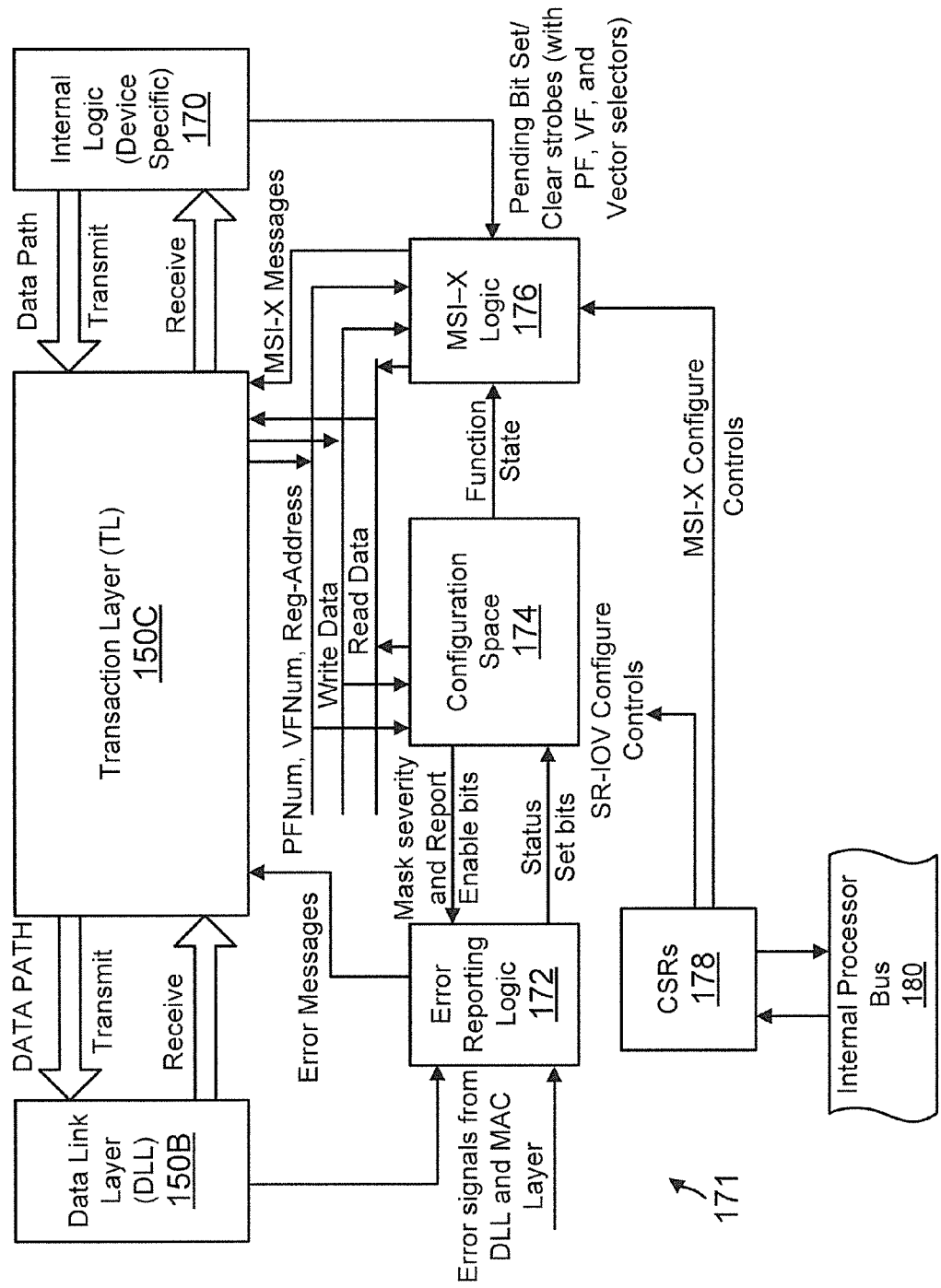
FIG. 1D shows a high level block diagram of a system used by the PCI-Express device of FIG. 1C.

FIG. 1D shows an example of a system 171 used at a PCI Express device/endpoint, for example, adapter 116, according to one embodiment. System 171 includes DLL 150B, TL 150C; Internal logic 170, Configuration Space 174; MSI-X Logic 176; Error Reporting Logic 172, CSRs (Command and Status Registers) 178 and an internal bus 180. DLL 150B and TL 150C have been described above with respect to FIG. 1C.

Internal logic 170 may be configured based on what the PCIe device is configured to do. Internal logic 170 may be a state machine, a processor or any other component to perform a function, for example, internal logic may include network module 120, storage module 122, processor 124 and others.

Configuration space 174 may include one or more registers for storing configuration information based on the controls provided from CSRs 178 that is coupled to internal processor bus 180. CSRs may be configured and loaded using internal bus 180.

Error reporting logic 172 generates error messages based on error signals from DLL and MAC layers. Error reporting logic 172 receives severity and report enable bits from configuration space 174. Error messages are sent to TL 150C, while status bits are set at Configuration Space 174.

MSI-X logic 176 is used to generate MSI-X messages via TL 150C, based on MSI-X controls from CSRs 178 and the function/state of a particular PF and/or VF. Internal logic 170 sets and clear pending bits at MSI-X logic 176 and provide PV/VF and vector information. Based on various signals MSI-X messages are generated and sent to TL 150C. Details regarding the various modules of system 171 are also provided below.

In one embodiment, a bank of VFs is provided, where each VFs may be numbered sequentially with an internal reference number that may be referred to as an XF number. The VFs may be organized into groups, called XF Groups. An XF group may have a certain number of VFs, for example, 8 or any other number. Each XF Group may also be numbered sequentially from 0 to a certain value. The maximum numbers of VFs that can be supported by a device can be obtained by: XF Group size*Total Number of XF groups.

In one embodiment, each PF can be assigned to a number of XF Groups. Of course, the sum of the numbers of assigned XF Groups of all PFs is less than or equal to the total number of XF Groups. Different number of XF groups may be assigned to different PFs. Thus, one is able to allocate an optimum number of XF groups to a PF depending on need and efficiency.

The number of XF Groups assigned to a PF, multiplied by the XF Group size, provides the number of VFs assigned to the PF. Given a particular allocation of XF Groups to PFs, an XF number may be calculated from any combination of PF and VF numbers within a supported range. Combining this transformation with the Function to (PF, VF) mapping algorithm defined by the SR-IOV standard allows Function Numbers to be converted to XF numbers.

Individual registers within a VF bank are addressable on an internal bus 180 (FIG. 1D), by a combination of an XF number and a Register Number. Configuration Read and Configuration Write transactions from the host 102 that target VFs are routed over the internal bus to the appropriate XF by translating the Bus Number and Function Number (from a header of a TLP) into an XF number, which is used along with the Register Number to compute the internal address of a targeted location (for example, a register).

In one embodiment, the mechanisms disclosed herein also use analogous measures for mapping interrupt vectors. A bank of MSI-X vectors (XVectors) may be provided that are numbered sequentially with an internal reference number (referred to as the XVector number). Additionally, XVectors are organized into groups that may be of fixed size (or variable size), called XVector Groups. As an example, an XVector Group may include 8 XVectors. The XVector Group size may be equal to the XF Group size, although any practical XVector Group size that is an integer multiple of the XF Group size can be used. XVector Groups may also be numbered sequentially from 0 to a maximum value. The number of XVector Groups, multiplied by the XVector Group size, provides the maximum number of interrupt vectors for adapter 116.

In one embodiment, each XVector Group may be assigned to an XF Group for generating interrupts. The range of XVector Groups assigned to a single XF Group may be contiguous. The XVectors in each XVector Group assigned to an XF Group may be distributed evenly among the XFs of that XF Group.

Any XVector Groups that remain, after the allocation of XVector Groups to XF Groups has been completed, may be allocated to one or more XPF Group. An XPF Group is a variable-sized subset of all of the device's PFs. Because the number of enabled PFs might not be related to the XVector Group size by an integer factor, there is the possibility that some XVectors will remain unallocated after an XVector allocation step, which are then wasted. The determination of XPF Group sizes will depend on the number of PFs enabled, and is done using a process designed to reduce the number of wasted vectors without excessive hardware complexity. Each XF Group or XPF Group can have an arbitrary number of XVector Groups assigned to it, within the constraint that the sum of the numbers of assigned XVector Groups of all XF Groups and XPF Groups are less than or equal to the total number of XVector Groups.

In one embodiment, systems and methods for mapping XVectors into a host memory space and for translating an internally generated interrupt request's PF Number, VF Number, and Vector number into an XVector number are provided. In another embodiment, systems and methods for translating an arbitration-winning XVector number into Bus and Function Numbers used for the header of the transmitted interrupt transaction are provided.

Allocation of XF Groups to PFs and allocation of XVector Groups to XF Groups and XPF groups may be controlled by a set of hardware registers. These registers are typically not readable or writeable by the host system 102. Instead, they are loaded after reset from a non-volatile memory such as 128. This is accomplished during the period following reset and prior to the time when the device begins accepting Configuration Reads and Writes from the host 102.

In another embodiment, the systems and methods described herein include provisions for handling Function-specific PCIe events; namely, Function-specific PCIe errors and Function Level Resets (FLRs). The PCIe standard provides for an optional Advanced Error Reporting (AER) Capability. Errors may be associated with an endpoint's upstream port or with a specific Function within adapter 116. In the latter case (i.e. Function-specific errors), the error is detected by the device's PCIe Transaction Layer logic (150C, FIG.

1C). The detecting logic is aware of the PCIe Function Number or the PF and VF Numbers associated with the error. A mapping transformation converts the Function Number, or the PF and VF Numbers, into an XF number (in the VF case) or into a PF Number (otherwise), which is used to route the error signal to the AER Capability of the associated Function, as described below.

The AER Capability also includes a Header Log register, which may be a part of the Configuration Space 174, which records a TLP Header (the initial 3 or 4 dwords) of the TLP that triggered the error, if applicable. The SR-IOV standard allows VFs belonging to the same PF to share a single VF Header Log. The shared VF Header Log for VFs of the same PF is distinct from the Header Log used by the PF itself. The embodiment of a shared VF Header Log entails using the reporting VF's PF Number to route the TLP Header information to the correct VF Header Log register.

A First Error Pointer register (also a part of Configuration Space 174) is also provided by the PCIe specification. This register indicates the error type of the first of possibly multiple Function-specific errors reported by the same Function. When a Correctable Error Status register bit corresponding to the First Error Pointer is set, then the Header Log for the Function is valid. The VF Number of the recorded TLP Header in a shared VF Header Log may be determined by finding the unique VF for which the VF Header Log is valid. Reading the VF Header Log entails using the PF and VF Numbers decoded from the Read Request transaction. Logic checks to see if the shared VF Header Log (selected by the PF Number) is valid for the given VF; if it is, then the contents of that VF Header Log are returned in the Read Completion, otherwise an empty Header Log value (all zeros) is returned.

A Function Level Reset (FLR) issued to a VF raises an internal reset signal that is directed to the resources assigned to that VF. FLRs issued to a PF also reset the VFs associated with that PF (as well as render them unaddressable by the host system, until they are re-enabled through the PF's SR-IOV Capability). Directly routing a reset to the correct set of XVectors associated with a Function, or with multiple Functions simultaneously, would need crossbar switching of the reset signal, which would incur a significant area increase (gate count) in the integrated circuit for adapter 116. In one embodiment, an alternative mechanism is provided to avoid this complexity. The alternative mechanism sequentially scans the XVectors, checking each in turn to determine if the Function owning it is in FLR.

This disclosure also provides a handshake between the FLR logic of each PF or VF and the hardware and/or firmware that is associated with that PF or VF. The handshake ensures that the FLR condition remains in effect until the client has completed any cleanup (such as clearing any outstanding context and user data associated with client processes). A prerequisite for completing the handshake is the clearing of XVectors associated with the target of the FLR. Since XVectors are cleared by a scanning mechanism, the detection of two completions of the scan (marked by a scan pointer wrapping back to 0), following the assertion of FLR, satisfies this requirement.

In the SR-IOV Specification, as described above, PFs are designated by a single number, PFNum (which is also the PF's Function Number as it is mapped in the PCIe hierarchy). VFs are designated by a pair of numbers (PFNum, VFNum), where PFNum is the PF Number of the PF controlling the VF, and VFNum is a number from 1 to the maximum VF number enabled for that PF. Since VFNum cannot be 0 when referring to a VF, the preferred embodiment uses a convention that (PFNum, 0) simply refers to the PF indicated by PFNum. The SR-IOV Specification provides that SR-IOV-capable devices implement an Alternative RID Interpretation (ARI) option of PCIe, in which a 16-bit Requester ID or Routing ID (RID) is parsed as a Bus Number (upper 8 bits) and Function Number (lower 8 bits). The original PCI definition of the RID utilizes an 8-bit Bus Number, a 5-bit Device Number, and a 3-bit Function Number.

In the description below, the following arithmetic and logic conventions apply: All variables are unsigned; Multiplication is represented by "*"; Division is represented by "/"; any fractional portion of a quotient is discarded. The remainder of a division operation ("a divided by b") is represented by "a % b"; Exponentiation is signified by "^"; and Logical operations "AND", "OR", and "NOT" are indicated by "&", "|", and "!", respectively.

Descriptions in pseudo code can be interpreted in a suitable Hardware Description Language (HDL) such as Verilog, System Verilog, or VHDL for synthesis into logic gates. Variable names are given in mixed case, while hardware design parameters (such as array sizes or bus widths) are given all upper case names.

Figure 2:
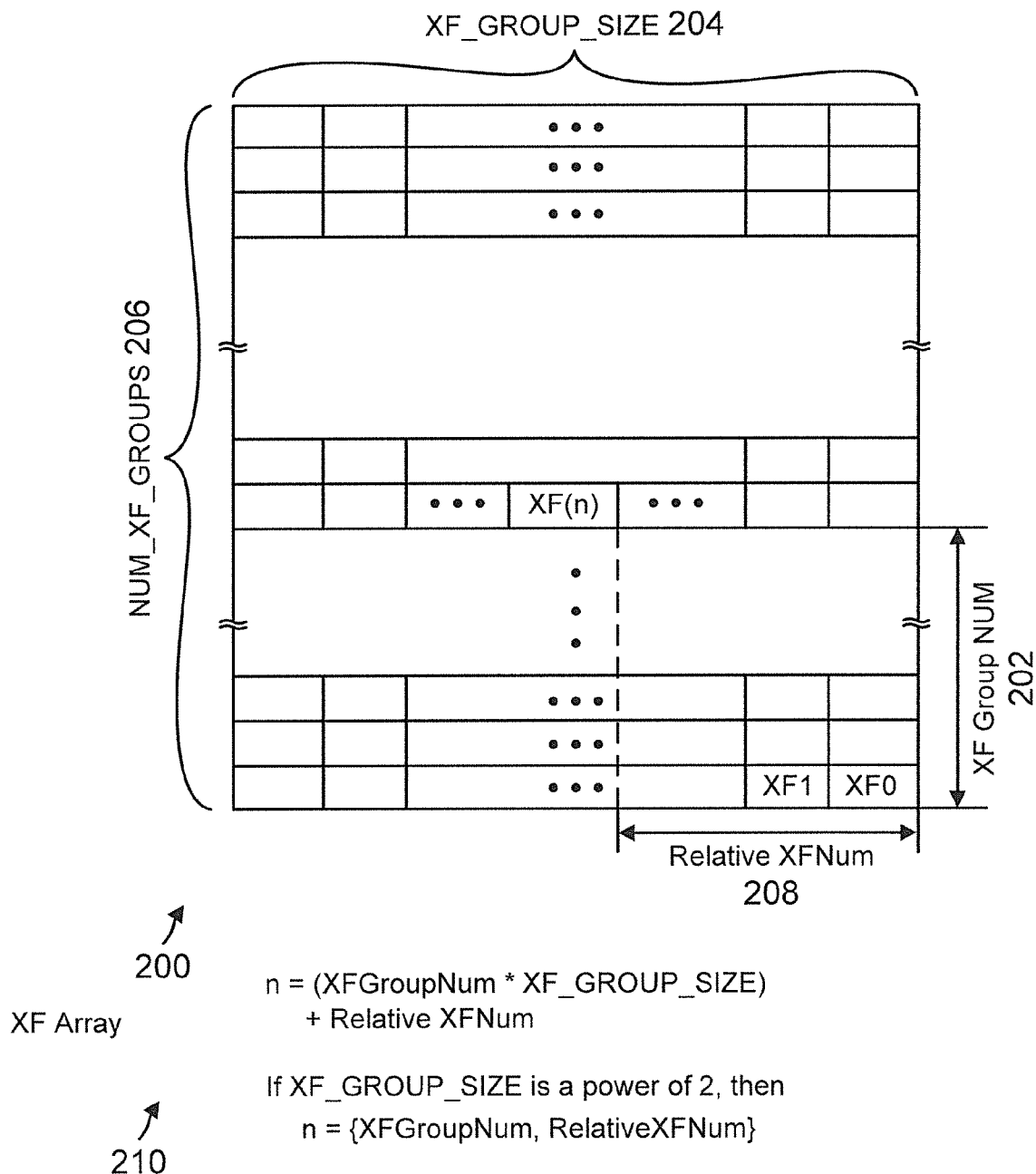
FIG. 2 shows an example of an XF array, according to one embodiment.

In one embodiment, each XF may be a collection of registers comprising a VF within the PCI Express Configuration Space 174. XFs (NUM_XFS), selectable by an XF Number are used, so that an XF Number in combination with a Configuration Space Address specifies a unique register. The pool of XFs is partitioned into a number of XF Groups (NUM_XF_GROUPS), where each XF Group includes a fixed number of XFs (XF_GROUP_SIZE). As an example, the total number of XFs may be determined by: NUM_XFS=NUM_XF_GROUPS*XF_GROUP_SIZE FIG. 2 shows an example, of a 2-dimensional array representation of XFs 200, according to one embodiment. Array 200 is indexed by an XF Group Number (ranging from 0 to NUM_XF_GROUPS−1) 202 and a Relative XF Number (ranging from 0 to XF_GROUP_SIZE−1) 208, according to one embodiment. The XF Group Number and Relative XF Number may be combined to obtain a single index, the XF Number (shown as "n" determined by equations 210). The XF_GROUP_SIZE is shown as 204 and NUM_XF_Groups are shown as 206.

In one embodiment, a convention is provided to use the XF Number to index PFs and non-SR-IOV Functions as well as VFs. This may be achieved by extending the XF Number by a bit and using the extra (most significant) bit as a PF indicator. When this bit is 0, the lower bits of the XF Number specify an. XF, and when this bit is 1, the lower bits of the XF Number specify either a PF or a non-SR-IOV Function.

Figure 3:
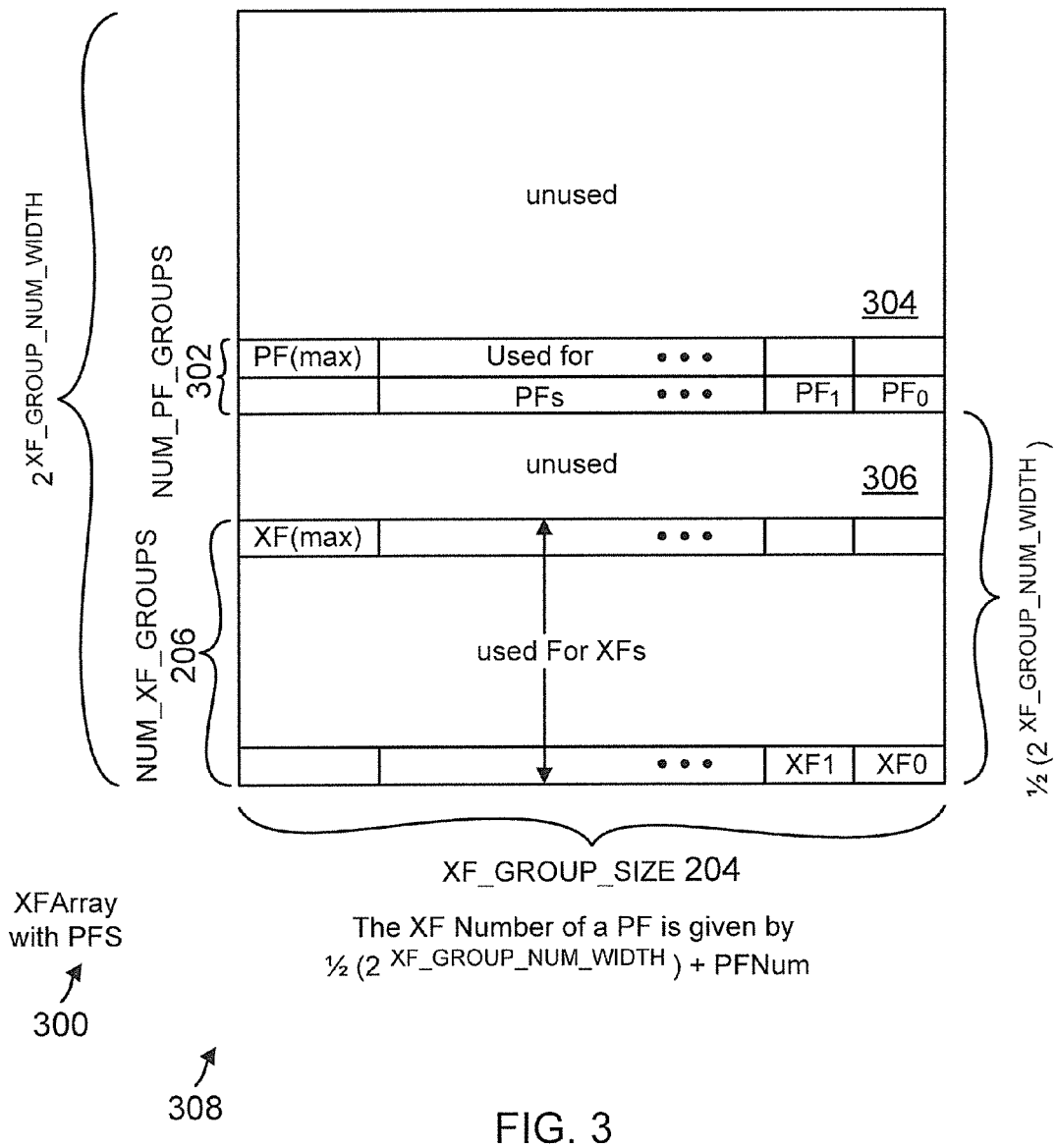
FIG. 3 shows an example, of XF-Array with physical functions (PFs), according to one embodiment.

FIG. 3 illustrates the foregoing convention with an array 300 which includes an XF array (similar to 200) and PFs. The array space shows the PF Groups as 302 and the XF groups as 206. The address space that is unused for PFs is shown as 304, while the space for unused XFs is shown as 306. Equation 308 shows how an XF number of a PF can be obtained.

The use of XF Numbers in this disclosure assumes that the XF_GROUP_SIZE may be a power of 2, so that the XF Number is a concatenation of the XF Group Number and Relative XF Number provided by:

XFNum[(XF_NUM_WIDTH−1):0]={PFIndicator, XFGroupNum[(XF_GROUP_NUM_WIDTH−1):0],RelativeXFNum[(REL_XF_NUM_WIDTH−1):0]};

where

XFNum=one-dimensional index selecting a PF or XF

PFIndicator=1 if the indexed Function is a PF, otherwise 0

XFGroupNum=XF Group Number to which the PF or XF belongs

RelativeXFNum=Relative XF Number of the PF or XF
XF_GROUP_NUM_WIDTH=number of bits to express (2*NUM_XF_GROUPS−1) in unsigned arithmetic
REL_XF_NUM_WIDTH=number of bits to express (XF_GROUP_SIZE−1) in unsigned arithmetic
XF_NUM_WIDTH=1+XF_GROUP_NUM_WIDTH+ REL_XF_NUM_WIDTH
NUM_XF_GROUPS need not be a power of 2.

Related to the XF Number is another index referred to herein as the XPF Number and is used for MSI-X Vector allocation. XPF may use a contiguous numbering, in which the XPF Number assigned to the first PF is an immediate successor of the last XPF Number assigned to a VF, and which skips PFs that are disabled and PFs which have no MSI-X Capability. For VFs, the XPF Number is the same as the XF Number. For PFs, the XPF Number (XPFNum) is determined as follows:

ShiftedPFNum=PFNum−(Number of disabled PFs less than PFNum)−(Number of enabled PFs below PFNum which do not have MSI-X Capability);

XPFNum=NUM_XFS+ShiftedPFNum;

An XPF Number is a concatenation of an XPF Group Number and a Relative XPF Number as follows:

XPFNum[(XPF_NUM_WIDTH−1):0]{XPFGroup-Num[(XPF_GROUPNUM_WIDTH−1):0],RelativeXPFNum[(REL_XF_NUM_WIDTH−1):0]} where
XPF_GROUP_NUM_WIDTH=Number of bits to express (NUM_XF_GROUPS+NUM_PF_GROUPS) in unsigned arithmetic
NUM_PF_GROUPS=(NUM_PFS+XF_GROUP_SIZE−1)/XF_GROUP_SIZE
XPF_NUM_WIDTH=XPF_GROUP_NUM_WIDTH+ REL_XF_NUM_WIDTH Disabled Functions and Functions without MSI-X Capability may be mapped to a reserved value (such as a binary value of "all ones"). For example, if an XF_GROUP_SIZE is 8, and there are 20 XF Groups, the last XF Number (and last XPF Number) used by a VF is 159 (decimal), or hexadecimal 9f. In one embodiment, PFs may have XPF Numbers assigned beginning with hexadecimal a0. If the only PFs with enabled MSI-X Capability are PFs 0, 2, and 5, then PF 0 will have XPFNum=hexadecimal a0, PF 2 will have XPFNum=hexadecimal a1, and PF 5 will have XPFNum=hexadecimal a2. All other PFs will have XPFNum=hexadecimal ff.

As mentioned above, each PCIe Function with MSI-X capability uses a number of MSI-X Vectors. Each Vector includes: a 64-bit Address field (read-write); a 32-bit Data field (read-write); a Mask bit (read-write) and a Pending bit (read-only). The Address, Data, and Mask fields for the Vectors of a single PCIe Function are mapped into a memory segment known as the MSI-X Table (726, FIG. 7). The Pending bits of the Function are mapped into a memory segment known as the Pending Bit Array (PBA) (see 724, FIG. 7).

A typical implementation of the PCIe standard stores the Address and Data fields of the MSI-X Table in a RAM, while the Mask and Pending bits are stored in flip-flops. Use of flip-flops allows the Mask and Pending bits to drive inputs of an arbiter (1004, FIG. 10). From a system's point of view, the Mask, Data, and Address fields of any single vector are all visible in four contiguous dwords of the MSI-X Table. Also, from the system's point of view, the Pending Bits of a Function are visible in contiguous bits of one or more dwords of the PBA. Typically, the MSI-X Table RAM is dedicated to that purpose, although some embodiments may integrate the MSI-X Table Address and Data into a more general-purpose RAM. Other embodiments may split MSI-X Table storage into multiple RAMs.

Figure 4:
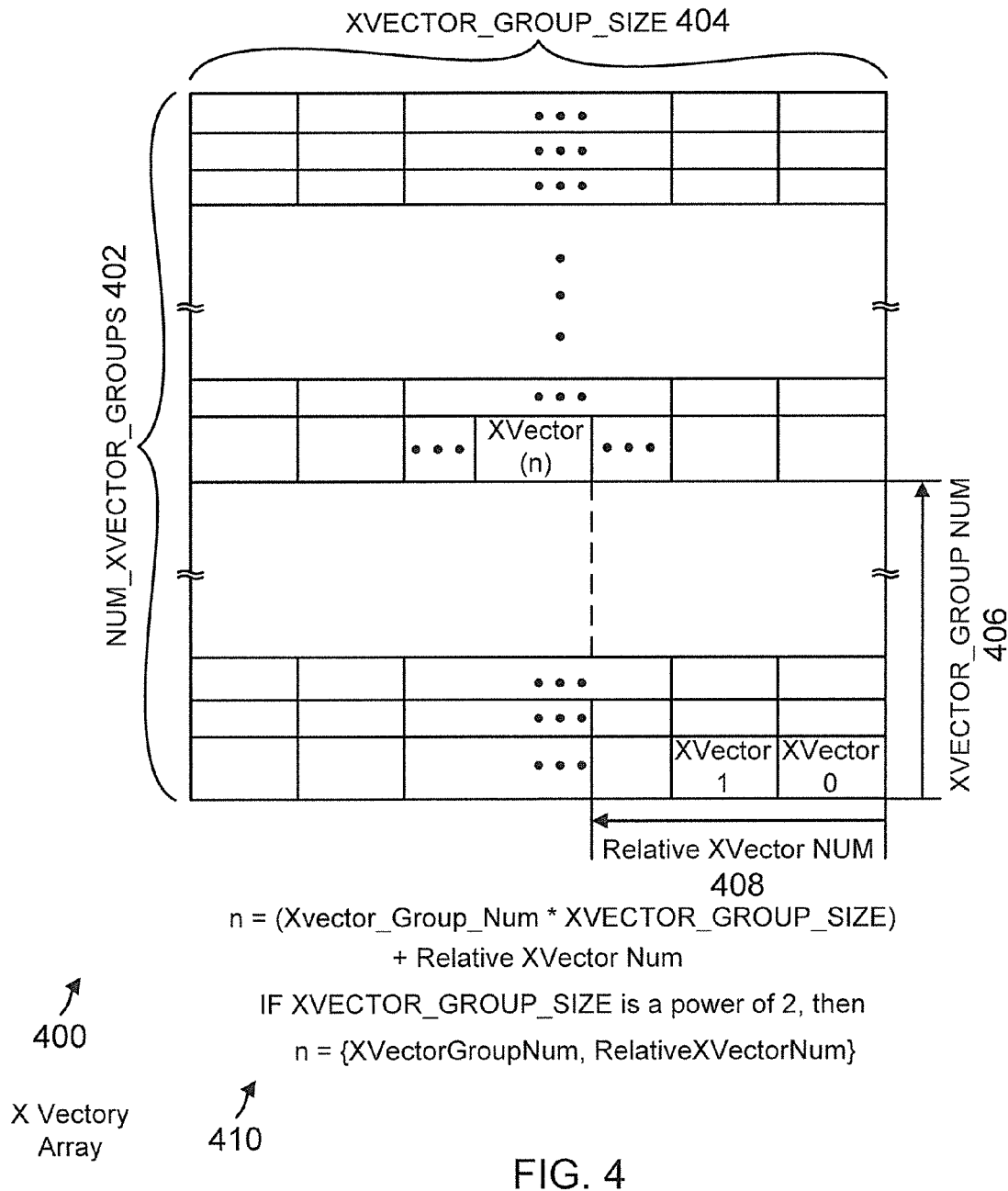
FIG. 4 is an example of a an XVector Array, according to one embodiment.

In one embodiment, re-allocable XVectors are provided that may be organized as follows:

A certain number of XVectors (NUM_XVECTORS) are selectable by an XVector Number. The XVector Number specifies an MSI-X Table RAM location with an Address and Data fields of an MSI-X Vector, and a Mask or Pending bit. The pool of XVectors is partitioned into a number of XVector Groups (NUM_XVECTOR_GROUPS), each XVector Group having a certain number of XVectors (XVECTOR_GROUP_SIZE). The three XVector-related parameters are related as follows: NUM_XVECTORS=NUM_XVECTOR_GROUPS* XVECTOR_GROUP_SIZE FIG. 4 shows a 2-dimensional array of XVectors 400, indexed by an XVector Group Number (ranging from 0 to NUM_XVECTOR_GROUPS−1) 406 and a Relative XVector Number 408 (ranging from 0 to XVECTOR_GROUP_SIZE−1). The XVector Group size is shown as 404 and the Xvector groups are shown as 402. The XVector Number (shown as n in FIG. 4) is the concatenation of the XVector Group Number 406 and the Relative XVector Number 408 and may be determined by using equation 410 of FIG. 4. An example of determining XVector Group Number is:

XVectorNum[(XVECTOR_NUM_WIDTH−1): 0]={XVectorGroupNum[(XVECTOR_GROUP_NUM_WIDTH−1): 0],RelativeXVectorNum [(REL_XVECTOR_NUM_WIDTH−1):0]}:

where
XVECTOR_GROUP_NUM_WIDTH=Number of bits to express (NUM_XVECTOR_GROUPS−1) in unsigned arithmetic
REL_XVECTOR_NUM_WIDTH=Number of bits to express (XVECTOR_GROUP_SIZE−1) in unsigned arithmetic
XVECTOR_NUM_WIDTH=XVECTOR_GROUP_NUM_WIDTH+REL_XVECTOR_NUM_WIDTH As an example, XVECTOR_GROUP_SIZE may be the same as the XF_GROUP_SIZE. However, any XVECTOR_GROUP_SIZE that is larger than XF_GROUP_SIZE, and is a power of 2 can be used.

Figure 5:
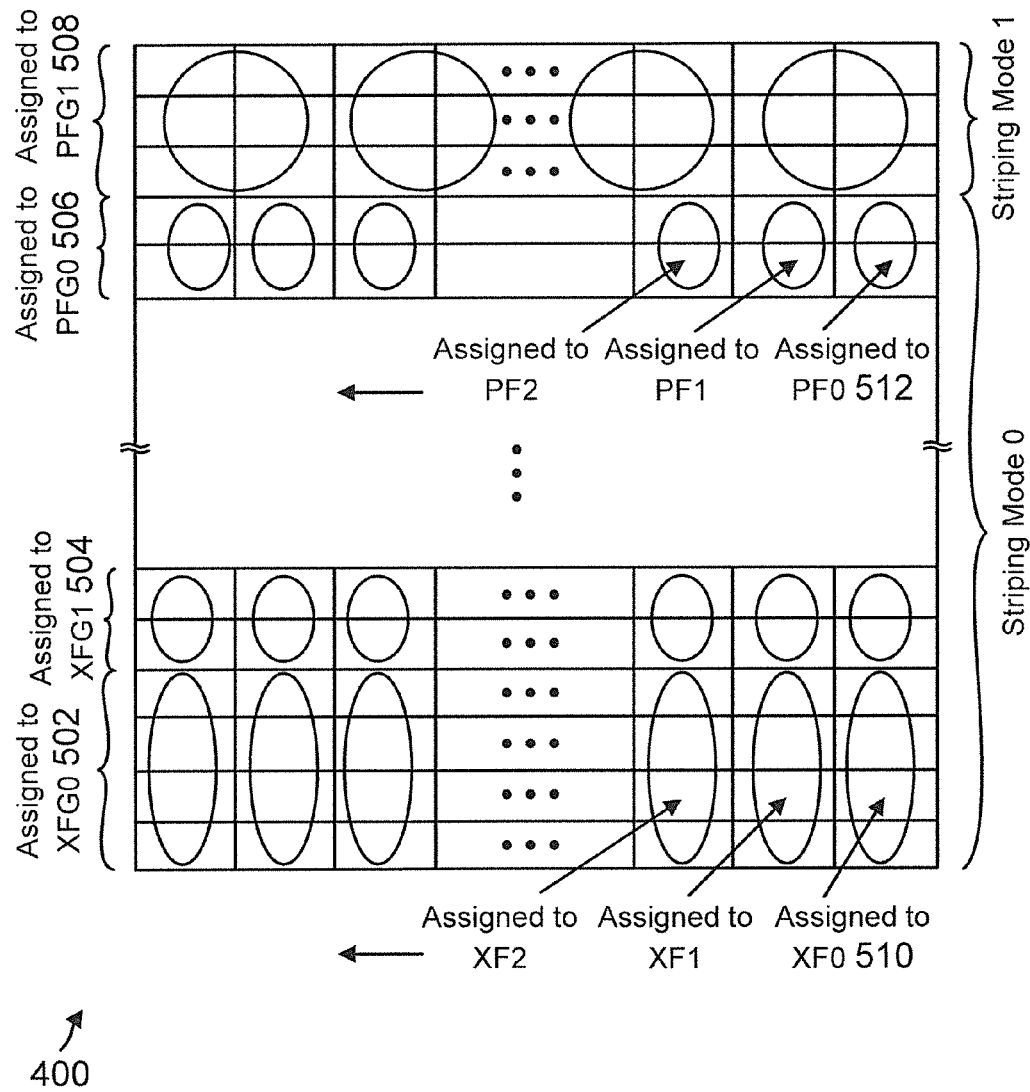
FIG. 5 shows an example of an XVector-Array with striping.

FIG. 5 shows an example of assigning XVectors from array 400. The XVector space is partitioned into vertical slices for assignment. A portion of the array 502/504 assigned to XF groups 0 and 1, while another portion 506/508 is assigned to PF groups. The XVectors that are assigned to XFs and PFs are shown as 510 and 512. Each XF may be assigned a contiguous range of XVector Groups (rows) 510. The assignment by column is done in accordance with a variable Striping Mode that defines a slice of XVector space that is assigned to an XF.

The number of Striping Modes may be equal to Log 2(XVECTOR_GROUP_SIZE)+1 and also assumes that XVECTOR_GROUP_SIZE is equal to XF_GROUP_SIZE.

Striping Modes other than 0 are used for PFs (See FIG. 5, Striping Mode 1). The Striping Mode for an XVector Group that is used by PFs is chosen depending on the number of PFs in the associated XF Group with enabled MSI-X Capability, in order to maximize the utilization of XVectors by PFs. This is done because the number of PFs with MSI-X may not always be evenly divisible into the XVector Group Size.

For Striping Mode 0, the Relative XVector Number of an XVector may be equal to the Relative XF Number of the XF or Relative XPF Number of the PF that it is assigned to.

For Striping Mode N, N !=0, the Relative XVector Number of an XVector is divided by $2^N$, with any fractional part discarded, to obtain a Relative XPF Number of the PF that it is assigned to. This means that $2^N$ columns of the array are assigned to each PF that is using a given XVector Group. Given the XPFGroupNum of an XF or PF, the Striping Mode can be found with the XPF to StripingMode procedure described below.

As an example, consider a device with 16 PFs (numbered 0 through 15), with NUM_XF_GROUPS=32 and with XF_GROUP_SIZE=8. Suppose that PF 0 through PF 7, PF 10, and PF 12 have MSI-X Capability enabled, while the remaining PFs have their MSI-X Capabilities disabled. Suppose also that there are 70 XVector Groups, and the first 64 XVector Groups are assigned to the VFs (i.e., the XFs in XPF Groups 0 through 31), that XVector Groups 64 through 67 are assigned to XPF Group 32, and that XVector Groups 68 and 69 are assigned to XPF Group 33.

With XVECTOR_GROUP_SIZE=XF_GROUP_SIZE=8, there are a total of 560 MSI-X Vectors, numbered from 0 through 559. In this configuration, the PFs that have MSI-X Capability may have the following XPF Numbers, XPF Group Numbers, Striping Modes, and XVector assignments (all values decimal): PF 0 XPF 256 XPF Group 32 Striping Mode 0 XVectors 512, 520, 528, 536; PF 1 XPF 257 XPF Group 32 Striping Mode 0 XVectors 513, 521, 529, 537; PF 2 XPF 258 XPF Group 32 Striping Mode 0 XVectors 514, 522, 530, 538; PF 3 XPF 259 XPF Group 32 Striping Mode 0 XVectors 515, 523, 531, 539; PF XPF 260 XPF Group 32 Striping Mode 0 XVectors 516, 524, 532, 540; PF 5 XPF 261 XPF Group 32 Striping Mode 0 XVectors 517, 525, 533, 541; PF 6 XPF 262 XPF Group 32 Striping Mode 0 XVectors 518, 526, 534, 542; PF 7 XPF 263 XPF Group 32 Striping Mode 0 XVectors 519, 527, 535, 543; PF 10 XPF 264 XPF Group 33 Striping Mode 2 XVectors 544, 545, 546, 547, 552, 553, 554, 555; PF 12 XPF 265 XPF Group 33 Striping Mode 2 XVectors 548, 549, 550, 551, 556, 557, 558, 559

Figure 6:
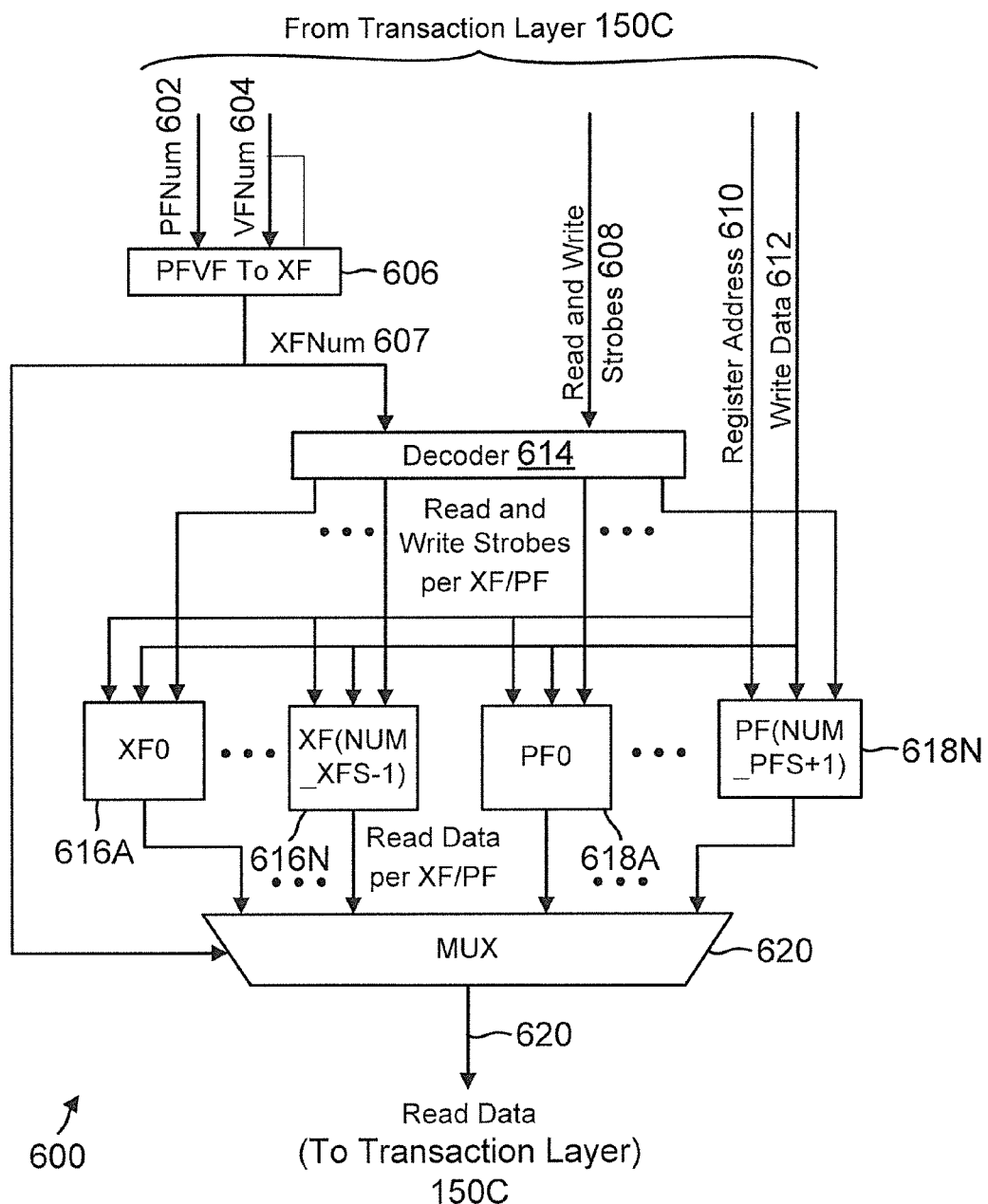
FIG. 6 shows an example of a system for accessing configuration space, according to one embodiment.

In one embodiment, as shown in FIG. 6, a method and system for accessing PCIe Configuration Space 174 (FIG. 1D) from TL 150C is provided. When the host 102 sends a Configuration Request (which may be Read or Write request) to adapter 116, fields in the packet header specify a Bus Number and a Function Number. The TL 150C analyzes the packet header and determines if it is a valid request for Configuration Space 174 access. If it is, then the Bus Number and Function Number are translated to a PF Number 602 and VF Number (PFNum, VFNum) 604 using a procedure defined in the SR-IOV Specification. PFVFToXF transformation is performed by logic 606, described below, to convert the (PFNum, VFNum) to an XFNum 607. XFNum 607 is then used by a decoder 614 as an index to select a specific XF (616A-616N), and the status of the XF is polled.

If the XF is disabled or in reset (e.g., due to a Function Level Reset), it is not allowed to respond to Configuration Requests, and a Completion TLP is generated with an Unsupported Request indication in the Status field of the TLP Header, and concurrently generates an Unsupported Request error.

If the XF indicated by XFNum is enabled, and not in reset, then the process continues as follows. The TL 150C places the request information (Register Number (or address) 610 and XFNum) on internal bus 180, along with a read or write strobe 608 (depending on the request type) and byte enable bits, and the write data 612 from the packet payload if the request is a write request. The XFNum selects a unique XF from among 616A-616N. In the case of a write request, the selected XF responds by writing the write data to the register addressed by the Register Number 610 (using the byte enable bits to determine which bytes of the register are modified). In the case of a read request, the selected XF responds by placing the current value of the register addressed by the Register Number on the read data field of the internal bus. When the internal bus cycle has been completed, the TL 150C generates a Completion packet in the manner prescribed by the PCIe Standard.

Figure 7:
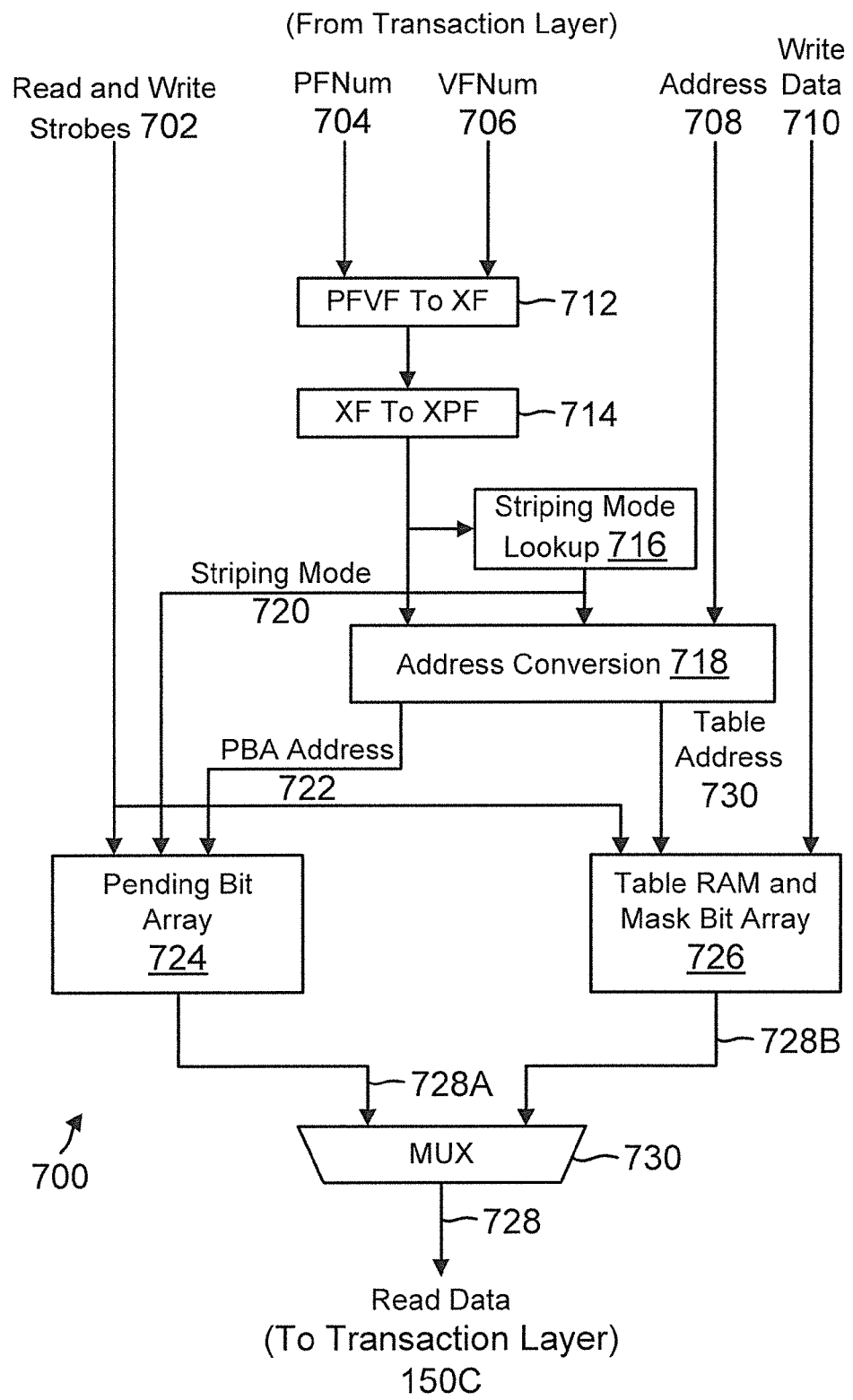
FIG. 7 shows a system for MSI-X and pending bit array access, according to one embodiment.

FIG. 7 shows a block diagram of a system (and process) 700 for accessing MSI-X Tables, according to one embodiment. The logic for system 700 is located at the MSI-X logic 176. The host system 102 may read or write a Function's MSI-X Table by sending a word, for example, a dword (32-bit) or qword (64-bit) Memory Read or Memory Write Request 710 to adapter 116, using an address range 708 that is assigned for the MSI-X Table in the Function's BARs. TL 150C decodes (PFNum, VFNum) of the Function being accessed, along with an offset from the Function's MSI-X Table base. The offset may be divided by 16 (the number of bytes per MSI-X Vector in the Table) to obtain a Vector Number.

PF 704 and VF Num 706 is then provided to PFVFToXF logic 712 that performs a transformation to convert (PFNum, VFNum) to an XF Number. The XF Number is translated into an XPF Number using the XFToXPF logic 714 as described below. The XPF number is provided to an address conversion logic 718 that provides a table address 730 for a table RAM and mask bit array 726. The address conversion logic 718 also provides a pending bit array address 722 that is used to index into the pending bit array 724 that stores pending bits for vectors that have requested interrupts. The pending bit array information 728A is provided to a Mux 730. The data read from memory 726 is also provided to Mux 730. The combined or separate data 728 is then provided to the TL 150C.

The XPF Number includes a XF Group Number and a Relative XPF Number. The XPF Group Number is used as an index to a lookup table to find the First XVector Group Number assigned to the XPF Group. The First XVector Group Number, Relative XPF Number, and Vector Number are transformed into an MSI-X Table RAM Address 730 (which is equivalent to the target vector's XVector Number) using the following:

StripingMode=XPFGroupToStripingMode(XPF-GroupNum,PFCount);

TableAddress =(FirstXVectorGroupNumber+(Vector/ $2^{\text{StripingMode}}$)* XVECTOR_GROUP_SIZE)+ (RelativeXPFNumber*($2^{\text{StripingMode}}$))+(Vector % ($2^{\text{StripingMode}}$));

Using the result of the calculation as the MSI-X Table RAM address, the targeted vector (728) is written or fetched in accordance with the TLP Request. The Table Address 730 also selects a targeted vector's Mask bit from an array of flip-flops having bits, to modify or fetch the Mask value.

If the operation is a Read request, the data from the RAM 726 and the Mask bit are merged in the proper format (per the PCI Specifications) to form a payload 728 for the Read Completion. Note that Table Address is in units of one MSI-X Table RAM entry (vector) per RAM location.

FIG. 7 also shows a block diagram for MSI-X Pending Bit access. The host system 102 may read a Function's Pending Bit Array (also referred to as "PBA") by sending a word, for example, a dword (32-bit) or qword (64-bit) Memory Read Request to adapter 116, using an address range 708 that is assigned for the PBA 724 in the Function's BARs. TL 150C determines the PFNum 704, VFNum 706 of the Function being accessed, along with an offset from the Function's PBA base. (PFNum, VFNum) is converted to an XPF Number using the PFVFToXF transformation followed by the XFToXPF transformation. The XPF Number includes a XPF Group Number and a Relative XPF Number. The address offset may be multiplied by 8 to get a Starting Vector Number. A lookup is performed to determine the First XVector Group Number assigned to the XF Group. A 64-bit slice of Pending Bits is constructed using the following procedure:

StripingMode=XPFGrouploStripingMode(XPFGroupNum, PFCount);
for (int i=0; i<64; i++)
  begin PBAIndex=((FirstXVectorGroupNumber+((StartingVector+i)/2^StripingMode)*XVECTOR_GROUP_SIZE)+(RelativeXPFNumber*(2^StripingMode))+(1% (2^StripingMode));
    if ((StartingVector+i)<NumVectors[XFNum])
      PendingBitSlice[i]=PendingBit[PBAIndex]; else
      PendingBitSlice[i]=0;
end "PendingBit" refers to a pool of Pending Bits, indexed linearly by a XVector number. NumVectors[XFNum] is a number of MSI-X Vectors allocated to a selected XF. This value matches (Table Size+1), where Table Size is the value reported in the bits of the MSI-X Capability Register in the Function's Configuration Space. PendingBitSlice is then formatted into the payload of the Read Completion that is generated in response to the PBA Memory Read Request. If the Read Request was for a dword, then the lowest 32 bits of PendingBitSlice are returned; if the Read Request was for a qword, then the full 64 bits are returned.

Figure 8:
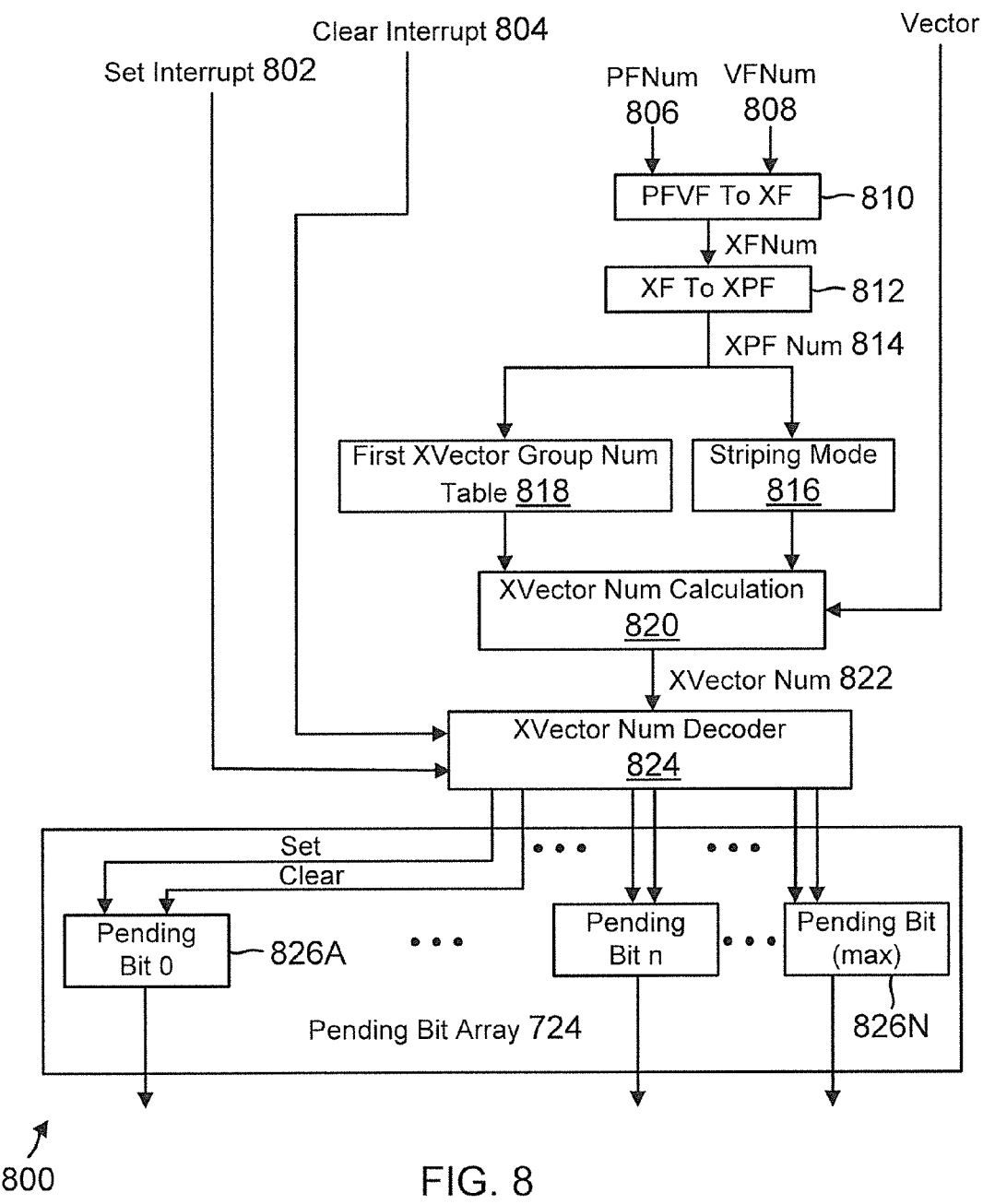
FIG. 8 shows an example of a system for controlling MSI-X pending bits, according to one embodiment.

FIG. 8 shows a block diagram for a process and system for allowing internal agents (for example, different hardware blocks, including network module 120, storage module 122, components of host interface 118 and others) of adapter 116 to set and clear Pending Bits. If an agent needs to generate an MSI-X interrupt, it asserts a Set Interrupt strobe 802 and indicates the Function Number for which the interrupt is to be issued, in the form (PFNum 806, VFNum 808), along with the Vector Number. The following procedure then yields the XVector Number:

From (PFNum, VFNum), determine XFNum using PFVFToXF logic 810, then calculate the XPFNum 814 using XFToXPF logic 812.

Extract XPFGroupNum from XPFNum, then calculate StripingMode using XPFGroupToStripingMode logic 816.

Use the FirstXVectorGroupNum lookup table 818 to find the FirstXVectorGroupNum assigned to XPFGroupNum.

Use the following procedure to convert XPFNum, Vector, FirstXVectorGroupNum, and StripingMode to an XVector Number 822 (XVectorNum) that is fed into decoder 824:

Begin XVectorGroup=FirstXVectorGroupNum+(Vector/ (2^StripingMode));
  RelXVectorNum=(XPFNum*(2^StripingMode))+ (Vector % (2^StripingMode));
  XVectorNum=
    (XVectorGroup*XVECTOR_GROUP_SIZE)+
    RelXVectorNum;
end The Set Interrupt strobe 802 is routed to the Pending Bit (826A-826N) of the XVector indicated by the XVector Number, where it causes the selected Pending Bit to be set. Hardware agents may also clear an MSI-X Pending Bit through an analogous process using signal 804.

Figure 9:
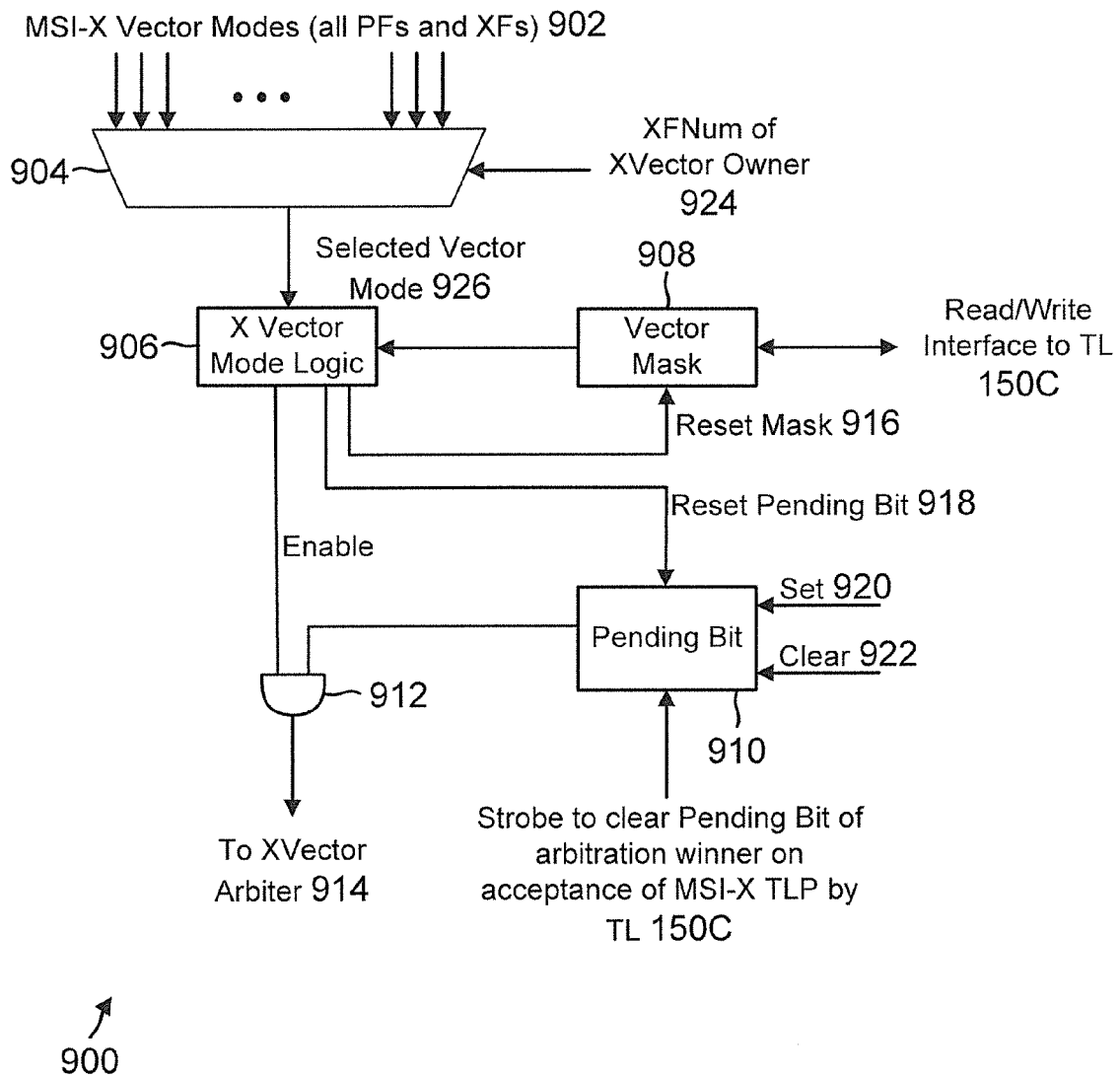
FIG. 9 shows an example of a system for handling pending bits and vector masks, according to one embodiment.

FIG. 9 shows a block diagram for a system/process 900 for MSI-X Mode Control, according to one embodiment. PCIe Specifications define a Mask bit for each MSI-X vector, as well as a Function Mask bit for all vectors of a Function. These bits are programmed by the host system 102. The Function Mask bit is programmable in the Function's Configuration Space, and the individual vector Mask bits are programmable through Configuration Space 174. Each XVector is associated with the proper controls for the PF or XF that owns the XVector which enables XVectors to be allocated flexibly among different PFs and XFs.

Each PF and XF provides a representation of its internal status related to MSI-X usage. The relevant information in a PF or XF can be encoded to yield one of the following four modes:

(a) RESET: The Function is disabled, or is in reset; associated MSI-X Vector Masks are set, and the Pending bit is held in reset. This is the state of unallocated XFs, of XFs corresponding to VFs that are not enabled through the associated PF's SR-IOV Capability Structure, and of any PF or XF that is in the FLR state.

(b) MSI-X_DISABLED: The Function is enabled and not in reset, but the MSI-X Enable bit in its Configuration Space is not set; and the Pending bit is held in the reset state.

(c) MSI-X_MASKED: The Function is enabled and not in reset, and has MSI-X Enable set, but either the Function Mask bit in its MSI-X Capability Structure is set, or the Bus Master Enable (BME) bit in the Function's PCI Control Register is not set; and the Pending Bit may be set by an interrupt-generating agent, but may not participate in arbitration.

(d) MSI-X_ENABLED: The Function is enabled and not in reset, has MSI-X Enable bit set, has its Function Mask bit cleared, and has its BME bit set; and the Pending Bit is allowed to participate in arbitration when it is set to 1 and the Vector Mask is set to 0.

FIG. 9 shows that MSI-X vector modes 902 for all PFs and VFs are placed at logic (or Mux) 904. In order to select the proper source of mode information, the XF Number of the PF or VF that owns each XVector needs to be known. This XF Number 924 will be the value of the XVector Owner is obtained as follows:

(a) Find the XPF Number (OwnerXPF) associated with the XVector Number using the XVectorToXPF transformation; and (b) Determine the XF Number (OwnerXF) from the OwnerXPF using the XPFToXF transformation.

The following table defines the behavior of an XVector for each mode:

| Inputs: | | Local XVector Controls: | | | |
|---|---|---|---|---|---|
| MSI-X Vector Mode of XVector Owner | Vector Mask | Set Mask | Reset Pending Bit | Enable |
| RESET | don't care | 1 | 1 | 0 |
| MSI-X_DISABLED | don't care | 0 | 1 | 0 |
| MSI-X_MASKED | don't care | 0 | 0 | 0 |
| MSI-X_ENABLED | 1 | 0 | 0 | 0 |
| MSI-X_ENABLED | 0 | 0 | 0 | 1 |

"Set Mask" means that the Vector Mask bit is forced to be set to 1.

"Reset Pending Bit" means that the Pending Bit of the vector is forced to be cleared to 0.

"Enable" means that the Pending Bit is allowed to participate in arbitration.

Figure 10:
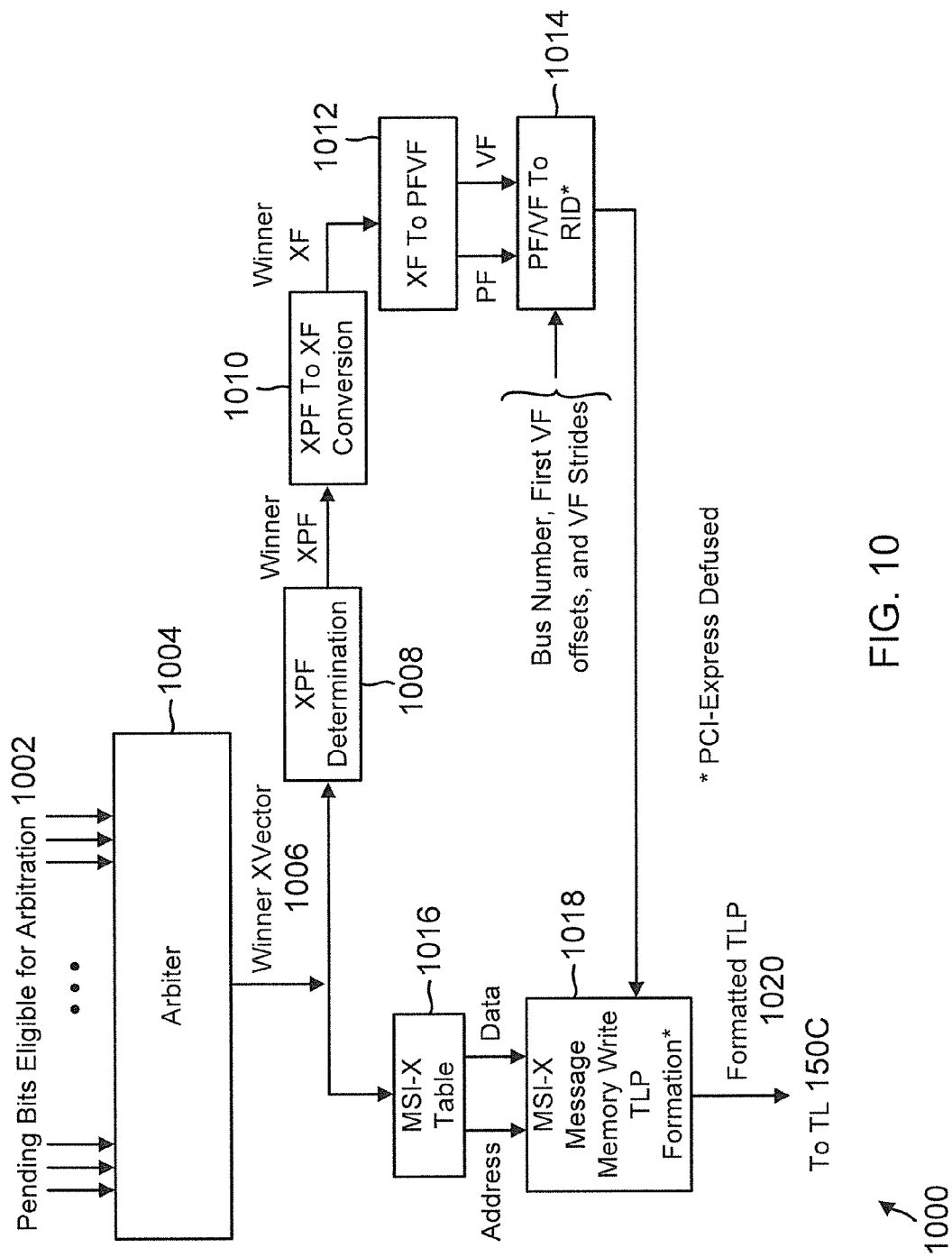
FIG. 10 shows a system for arbitrating between MSI-X XVector requests and TLP generation, according to one embodiment.

Based on 924, a vector mode 926 is selected after applying a vector mask 908. The mask may be reset based on signal 916. If a Pending Bit is set, and the associated Function is in the MSI-X_ENABLED state, then the Pending Bit 914 via logic 912 is forwarded to the Arbiter as shown in FIG. 10. The array of all qualified Pending Bits is fed into the arbiter, where each bit represents a requesting interrupt vector. Any arbitration method suitable for MSI-X interrupt arbitration may be used. The winner of the arbitration is indicated by an XVector Number, called WinnerXVector. The pending bit 910 may be set using 920 and cleared by signal 922. The pending bit may also be cleared by signal 918.

FIG. 10 also shows a block diagram of system 1000 for MSI-X Message Generation and Pending Bit Clearing, according to one embodiment. System 1000 includes an arbiter (arbitration module 1004) that receives a plurality of "pending" bits 1002 for arbitration. The arbitration is performed because one pending bit is handled by the interrupt generation logic for generating an interrupt. An arbitration winner (WinnerXVector) 1006 is declared by the arbiter 1004. WinnerXVector 1006 is used as the read address for looking up an MSI-X Table entry in the MSI-X Table 1016. The result of the lookup is the MSI-X Vector Address and Data that is sent to module 1018 that formats a MSI-X message write TLP.

Adapter 116 formats a Memory Write Request TLP 1020 targeting a selected Address, with a selected data as payload. The TLP 1020 is generated to signal an interrupt to host 102. The TLP 1020 is a Memory Write Request with the winning Vector 1006's Address and Data fields from the MSI-X Table 1016. The TLP also includes a Requester Id (RID) identifying the source of the interrupt by a Bus Number and Function Number. The header of the TLP includes the RID of the Function originating the interrupt. The Requester ID is generated as follows:

(a) Use the winner XVector to find the XPF Number (WinnerXPF) by the XVectorToXPF transformation by module 1008.

(b) Determine the XF Number (WinnerXF) from the WinnerXPF using the XPFToXF transformation by module 1010.

(c) Convert the WinnerXF to a (WinnerPF, WinnerVF) pair using the XFToPFVF transformation by module 1012.

(d) Convert the (WinnerPF, WinnerVF) to a Function Number using the ARI method prescribed by the PCI Express Specification and executed by module 1014.

(e) Combine the resulting Function Number with the device's stored Bus Number using the ARI method prescribed by the PCI Express Specification to obtain the Requester ID.

Once the generated Memory Write Request TLP has been queued in the Transaction Layer 150C, the Pending Bit associated with the WinnerXVector is cleared.

Error Reporting:

As mentioned above, PCI-Express devices support three classes of error reporting. The first class is legacy error reporting, which provides backward compatibility with legacy PCI software. Reporting a legacy error entails setting a corresponding error status bit in a PCI Status Register. Legacy error reporting covers a subset of the possible PCI Express error types.

The second class is PCI-Express error reporting, which entails setting a corresponding status bit in a PCI-Express Device Status Register of each Function and transmitting a Message Request TLP to the host system 102 to report all Correctable, Non-Fatal, and Fatal errors. All PCI Express error types are reportable by this method.

A third class of error reporting is the optional AER that augments the PCI Express error reporting with Correctable Error Status and Uncorrectable Error Status Registers that identify the specific reason for each error, along with programmable Mask bits that enable reporting of errors of any type to be suppressed. For uncorrectable errors, there are programmable Severity bits that determine whether an error type will be treated as Non-Fatal or Fatal. A First Error Pointer that indicates by numeric value which error type occurred first (when multiple uncorrectable errors are reported in the same Function). A Header Log register of Configuration Space 174 saves a 3-dword or 4-dword header of a TLP that triggers an uncorrectable error. The First Error Pointer allows software to distinguish which, of multiple Uncorrectable Error Status Register bits that are asserted, was the first one to occur. The First Error Pointer is valid when the Uncorrectable Error Status bit that it is pointing to is set to one.

Errors that are triggered by a receipt of a TLP that can be associated (via the information in the TLP header) with a single Function are called Function-specific errors. Completion Timeout Errors are also Function-specific. All other errors are called non-Function-specific errors. All non-Function-specific errors are reported in the lowest-numbered Function for which a Mask bit corresponding to the error type is not set. Function-specific errors are reported by the associated Function.

For SR-IOV devices (for example, adapter 116), VFs are allowed to report Function-specific errors. The SR-IOV Specification allows sharing of a single Header Log by all of the VFs of a given PF. Because devices can have large numbers of VFs, and each Header Log uses 128 storage bits to implement, this allowance substantially reduces the silicon area to implement AER in SR-IOV devices. Additionally, the Mask and Severity bits are not implemented in VFs; instead, each VF uses the Mask and Severity bits of its parent PF.

Error detection and classification is performed by logic that generates a type-specific indication (in the form of a strobe to set a status bit) for the error, performs masking of the error, classifies the severity of the error, and indicates (by PF and VF Numbers) the Function that has to report the error. In one embodiment, the present disclosure specifies how information related to Function-specific errors is routed to the correct XF or PF for reporting.

Figure 11:
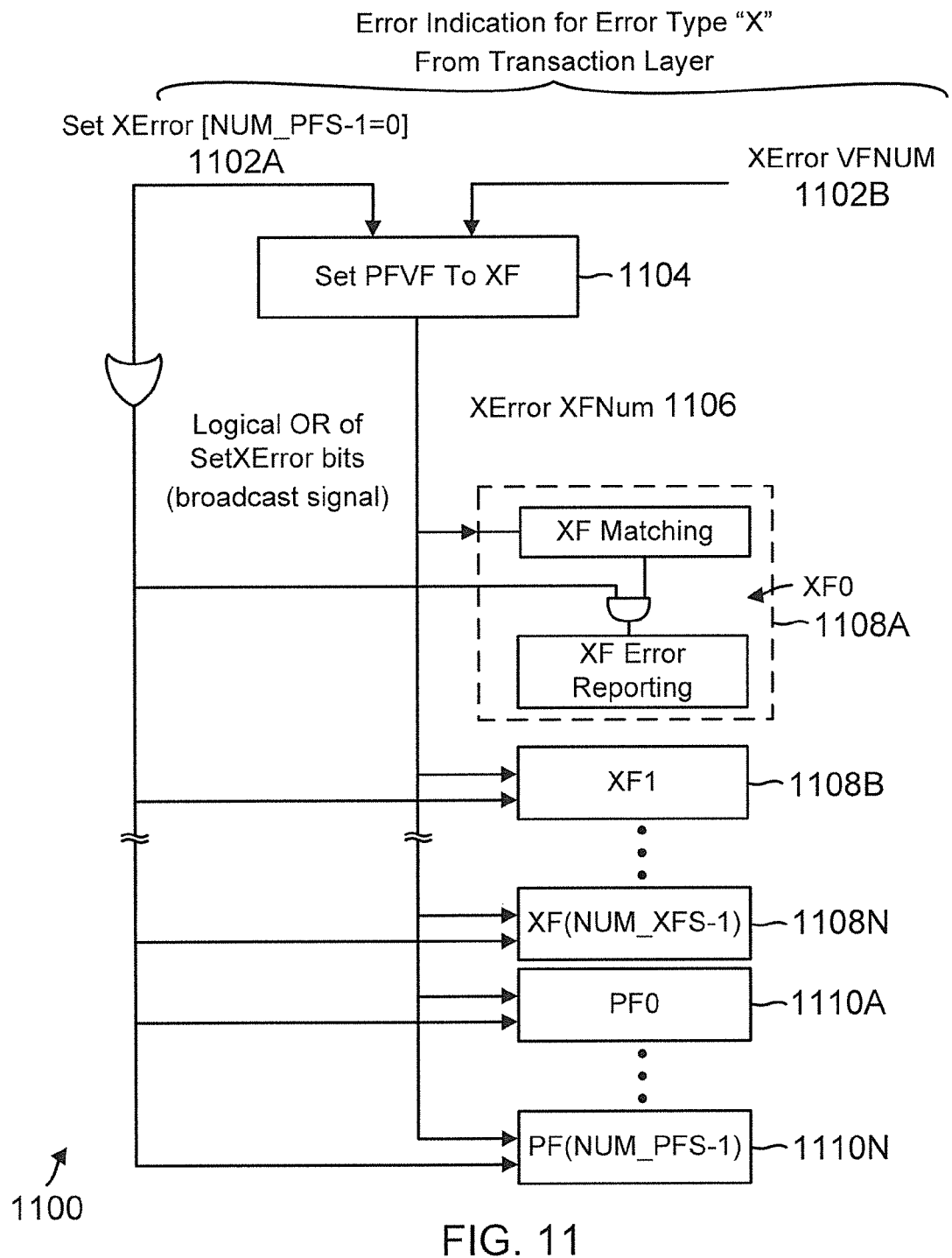
FIG. 11 shows a system for error status reporting, according to one embodiment.

FIG. 11 shows a block diagram of a system 1300 for all three error reporting classes i.e. legacy, PCI Express, and AER. Error type X (where X is one of the Function-specific errors defined by PCI Express for example, Poisoned TLP, Unsupported Request, Completer Abort, Unexpected Completion, or Completion Timeout) can be reported by using a signal vector (SetXError[(NUM_PFS−1):0]) 1102A and a VF Number indication (XErrorVFNum) 1102B as described below in detail. XF error reorting includes a status bit associated with an error type ("X") and for AER, a First Error Pointer and a state machine associated with header Log sharing.

An error of type X detected on (PFNum, VFNum) results in SetXError[PFNum] 1102A being asserted while XErrorVFNum (1102B)=VFNum. Module 1104 performs the SetPFVFToXF transformation to generate the identity (XErrorXFNum) 1106 of the XF or PF that reported the error. The logical OR of the bits of the SetXError vector is distributed, along with XErrorXFNum, to all XFs (1108A-1108N) and PFs (1110A-1110N). The XF or PF whose identity matches XErrorXFNum then responds to the SetXError strobe by setting a status bit (specified by the PCIe Specification).

AER is a PCIe capability that provides a more fine-grained detail of the type of error, and finer control on which errors are reported. The SR-IOV Specification makes the following error types reportable by VFs using AER: Poisoned TLP, Completer Abort, Unsupported Request, Unexpected Completion, Completion Timeout, Advisory Non-Fatal Error and Header Log Overflow (optional). Advisory Non-Fatal Error is used to report certain subcases of the first five error types. Errors fitting these subcases are reported by setting the AER Uncorrectable Error Status Register bit associated with the parent case, as well as the Advisory Non-Fatal Error bit in the AER Correctable Error Status Register. A Correctable Error Message is sent instead of the Non-Fatal Error Message or Fatal Error Message that would be sent if the error did not meet any of the Advisory Non-Fatal Error subcase criteria.

Figure 12:
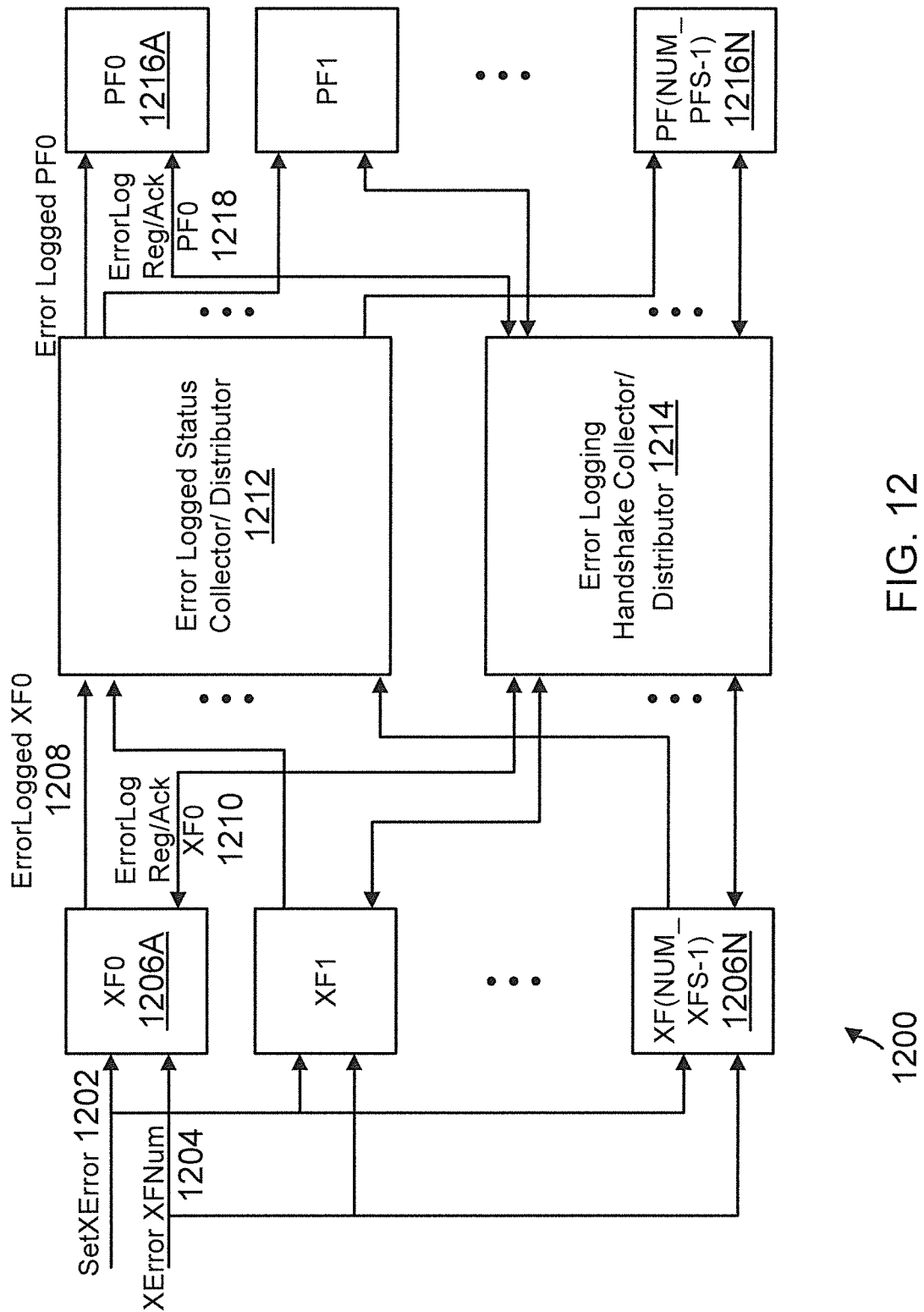
FIG. 12 shows a system for header log status and control signal distribution, according to one embodiment.

In one embodiment, the disclosure supports a shared VF Header Log option, in which all VFs associated with a given PF share a single Header Log. Because the shared VF Header Log is shared across all VFs of a single PF, routing the header to the correct Header Log is performed by the error's PF Number. FIG. 12 shows an example of a shared VF header logging status and control signal distribution system 1200, according to one embodiment. System 1200 is described below in detail.

In one embodiment, the systems disclosed herein determine when an error is allowed to cause a Header Log to be loaded. If any of the XFs sharing that Header Log has a valid First Error Pointer, then that XF owns the contents of the Header Log. The Header Log contents are then locked until the owning XF's First Error Pointer becomes invalid (which happens by clearing the status bit in the owning XF's Uncorrectable Error Status Register that is associated with the Header Log Entry). The process for determining when the Header Log is locked (and therefore, when loading a new TLP Header into the Header Log is prohibited) is as follows:

1. Each XF has a Header Log state machine (1206A-1206N) that receives Set XEroor 1202 and XErrorXFNum 1204. The state machine indicates to module 1212 when it has logged an error in its assigned shared Header Log, and this information is reported as the signal Error Logged 1208. Initially, for all XFs, the state machine reports that no TLP Header has been logged by the XF, and Error Logged is 0.

2. For each XF Group, a variable XFG_PFNum, which is associated with each XF Group, identifies the PF that owns the XFs in that XF Group. This information allows the Error-Logged output of the XF to be routed to a collector gate for the owning PF. The collector 1212 ORs all of the XF Error Logged status signals routed to it, and the result indicates whether the shared Header Log corresponding to that PF contains a valid TLP Header logged by one of the PF's VFs. The collected ErrorLogged signals of all XFs assigned to each PF are then distributed to the PF (1216A-1216N), as shown in FIG. 12.

3. If an XF makes a request to log a new value in a shared Header Log, and the result of the OR operation in step 2 for that shared Header Log is 0, then the requested value is loaded into the Header Log. If the request is made while the result of the OR operation in step 2 is 1, then the request is ignored.

4. If decision in step 3 results in loading of the shared Header Log, then an acknowledgment (1210/1218) is returned to the XF that reported the error. If the XF receives such an acknowledgment, then the XF updates its Header Log state machine to indicate that it owns the Header Log contents. If the request was rejected, then the XF updates the state machine to indicate that it had a rejected logging request (in other words, a Header Log overflow condition occurred). In either case, the new state will be maintained until the First Error Pointer of the XF becomes invalid through the clearing of the Uncorrected Error Status Register bit. The logging request and acknowledgment signals constitute a handshake between the XF and its associated PF. The collection and distribution of the error logging handshake signals is shown in FIG. 12.

An XF will request logging of a TLP Header in the shared Header Log when an error, other than Completion Timeout, occurs that is associated with that XF, provided that both of these conditions are met: The parent PF of the XF does not have its Mask bit set for the particular error type; and the XF does not have any Uncorrectable Error Status Register bits already set at the time the error occurs. Completion Timeout errors are not associated with received TLPs, so they do not result in header logging.

In another embodiment, for implementing the shared Header Logs returns a proper value when an XF's Header Log is read. PCIe and SR-IOV specifications provide that a read of the XF Header Log should return the logged TLP Header when the XF is the owner of that information, all is if it had a rejected attempt to load the Header Log, and all Os otherwise. The XF's Header Log state machine described above is used to determine which of these three cases is to be followed. The other determination that is performed is to determine which of the shared Header Logs the XF is assigned to. This corresponds to the PF Number to which the XF is assigned. The PF Number of each XF is a known value, and this value is used as the select input of a multiplexer to choose the correct Header Log value to return.

Function Level Reset (FLR): As described above, FLR is a PCI Express feature that allows a host system application to selectively reset Functions of a multi-Function device. It is optional in the base PCIe Specification, but is used for PFs and VFs of SR-IOV devices. For a PF, one effect of receiving an FLR is to clear a VF Enable bit, thereby disabling all VFs associated with the PF. VF Enable is a bit in the SR-IOV Capability Structure, used to enable the VFs that are associated with the PF. This raises the problem of ensuring that a PF's VF Enable is distributed to the XFs owned by the PF, and no other XFs. This disclosure solves this problem by routing VF Enables from all PFs to all XFs. Since XFG_PFNum indicates to each XF the identity of the PF owning the XF Group that the XF resides in, the XF needs to use XFG_PFNum to determine which of the VF Enable bits to examine. An XF that sees that the VF Enable from the PF selected by XFG_PFNum is negated will reset all of the registers in its Configuration Space and its Header Log state machine. VF Enable stays negated until host system writes one to it, so the XF will keep these items in reset until that happens.

When an FLR is issued to an XF, the XF will clear all of its Configuration registers and its Header Log state machine. When a Function is placed in FLR, the FLR condition is held until all of the device's internal resources have been cleared of user data and context information associated with that Function. The resources include MSI-X Vectors as well as application-specific memory structures (such as queue pointers and data buffers) within the device. The MSI-X operations corresponding to the RESET Function state are described above. The following method determines when the XVectors associated with the Function in FLR have all been reset:

1. Each Function (PF or XF) has an FLR state machine, with four states: IDLE, WAIT_1, WAIT_2, and WAIT_DONE. This state machine is normally in IDLE. When the Initiate FLR bit in the Function's PCIe Device Control Register is set to one by the host system, the state machine transitions from the IDLE state to the WAIT_1 state, and indicates that it is in RESET.

2. Simultaneously with the transition of a Function from the IDLE state to the WAIT_1 state, a notification is sent to a firmware or hardware agent at adapter 116, indicating that the Function is in FLR. This agent begins clearing user data and context information (other than MSI-X Vectors) associated with the Function in FLR.

3. An XVectorCounter cycles through the indices of all of the XVectors, and each XVector is updated according to the associated XF or PF state, as described above. When the counter reaches its terminal count, it recycles to zero and starts over; the terminal count condition also generates a pulse that is broadcast to the FLR state machines of every Function. For FLR state machines in the WAIT_1 state, the pulse causes a transition to the WAIT_2 state, which indicates that a sweep of all of the XVectors has begun. For FLR state machines in the WAIT_2 state, the pulse causes a transition to the WAIT_DONE state, indicating that the previous sweep has completed. Since Functions in WAIT_2 were placed into FLR before the start of the previous sweep, the receipt of the pulse while in WAIT_2 indicates that all XVectors of that Function have been reset, so WAIT_DONE indicates that the necessary XVector resets have been performed for the Function. Once in WAIT_DONE, the FLR state machine provides a status indication called FLR Ready, which can be polled by firmware.

4. When the firmware or hardware agent has completed the activity in step 2, it polls the Function's FLR Ready status. The PFVFToX transformation is used to route the agent's FLR Ready polling request to the proper XF or PF. The agent repeats polling of the status until it finds the Function's FLR Ready is asserted. When the polling completes with FLR Ready asserted, the agent issues a strobe (FLR Done) to the Function, causing the Function's FLR state machine to return to IDLE, and resetting the Function's Initiate FLR bit. Since the FLR Done signal is a strobe that is routed to an XF, it can be implemented as a PF-specific FLR Done strobe, along with the target Function's VF Number, so that the SetPFVFToXF transformation can be used to determine the XF Number. The XF Number identifies the PF or XF that responds to the FLR Done signal.

Common Transformations: The following transformations are common to several of the processes/systems discussed above:

SetPFVFToXF: Converts strobes from PFs, accompanied by a VF Number, to an XF Number which can be used to route the strobe to the appropriate target.
  Output: XFNum
  Inputs: SetPF[(NUM_PFS−1):0]: One bit per PF; one bit asserted per clock cycle.
  VFNumFirstXFGroup[(NUM_PFS−1):0]: Inputs from CSRs indicating the first XF Group Number assigned to each PF.
  Procedure:
    Begin
      XFNum=2^XF_NUM_WIDTH−1; // Default: all bits of XFNum set to one to // indicate inputs do not specify a valid Function for (i=0; i<NUM_PFS; i++) begin
        if (SetPF[i]) begin
          if (VFNum==0) begin // PF case
          XFNum=2^(XF_NUM_WIDTH−1)+i;
          end
          else begin // VF case XFNum=(FirstXFGroup[i]* XF_GROUP_SIZE)+VFNum−1;
          end
        end
      end
    end PFVFToXF: Converts a PF Number and a VF Number to an XF Number which can be used to select the appropriate source or target for an action.
  Output: XFNum
  Inputs: PFNum; VFNum
    FirstXFGroup[(NUM_PFS−1):0]: Inputs from CSRs indicating the first XF Group Number assigned to each PF.
  Procedure:
    Begin
      XFNum=2^XF_NUM_WIDTH−1; // Default: all bits of XFNum set to one to // indicate inputs do not specify a valid Function
      for (i=0; i<NUM_PFS; i++) begin
        if (PFNum==i) begin
          if (VFNum==0) begin // PF case
          XFNum=2^(XF_NUM_WIDTH−1)+
          end
          else begin // VF case
          XFNum=(FirstXFGroup[i]*XF_GROUP_SIZE)+VFNum−1;
          end
        end
      end
    end XFToPFVF: Converts an XF Number to the corresponding PF Number and VF Number, and produces a flag (Valid) indicating that the conversion is valid.
  Outputs:
    Valid; PFNum; VFNum
  Inputs: XFNum
    FirstXFGroup[(NUM_PFS−1):0]: Inputs from CSRs indicating the first XF Group Number assigned to each PF.
  Procedure:
    begin
      Valid=0; // Indicate invalid Function by default in case no match is found
      PFNum=0;
      VFNum=0;
      if       (XFNum>=(2^(XF_NUM_WIDTH−1)+NUM_PFS)) begin
        // Do nothing (Function is not valid: largest valid XFNum exceeded)
      end
      else if (XFNum>=2^(XF_NUM_WIDTH−1)) begin
        // Function (if valid) is a PF:
        PFNum=XFNum−2^(XF_NUM_WIDTH−1);
        Valid=1;
      end
      // NOTE: The following else-if branch is not required if NUM_XFS is a power of 2.
      else if (XFNum>=NUM_XFS) begin
        // Do nothing (Function is not valid: not a PF, and XFNum exceeds
        // largest valid XFNum for a VF)
      end
      else begin
        // Function (if valid) is a VF:
        // For each PF, mark the result as valid if XFNum is greater
        // than the least XF assigned to that PF. If valid, then subtract // the First XF Group Number of the PF from the XF Group Number of
// XFNum, and add 1 to get a speculative VF Number for that PF. The
// highest PF Number with a valid speculative VF Number is the
// PFNum, and its speculative VF Number is the
// VFNum.
for (p=0; p<NUM_PFS; p++) begin
if    (XFNum>=(FirstXFGroup[p]*XF_GROUP_SIZE)) begin
PFNum=p;
VFNum=XFNum−(FirstXFGroup[p]*XF_GROUP_SIZE)+1;
Valid=1;
end XFToXPF: This transformation generates a modified version of the XF Number called the XPF Number. The XF Number format maps PFs to XF Numbers that are aligned to the least power of 2 that is greater than the largest XF Number of any VF. For MSI-X resources, logic is greatly simplified by using the XPF Number format, which for VFs is identical to the XF Number, but which maps PF Numbers into a set that is contiguous with the XF Number associated with VFs. Also, if the mapped Function is out of range, or is not permitted to use the MSI-X resources (as dictated by a CSR), then the output of this transformation will be all ones.
Output: XPFNum
Inputs: XFNum
  MSIXEnable[(NUM_PFS−1):0]: Static inputs from CSRs indicating which PFs have MSI-X Capabilities enabled.
Procedure:
  XPFNum=2^XPF NUM_WIDTH−1; // Default: all bits of XFNum set to one to indicate // inputs do not specify an MSI-X-enabled Function
begin
  if (XFNum<2^(XF_NUM_WIDTH−1)) begin
    if (XFNum<NUM_XFS) begin
      XPFNum=XFNum; // Function is a VF, so XPF and XF Numbers are the same.
    end
  end
  else begin
    XPFNum=NUM_XFS; // Set XPFNum to start of PF range of values.
    if (
      // Check that PFNum is in legal range, and PF is enabled to use MSI-X.
      ((XFNum−2^(XF_NUM_WIDTH−1))
      <NUM_PFS) &
      MSIXEnable[XFNum−2^(XF_NUM_WIDTH−1)])
    begin
      for (p=0; p<(XFNum−2^(XF_NUM_WIDTH−1)); p++) begin
        if (MSIXEnable[p]) XPFNum++; // Count MSI-X-enabled PFs less than // PFNum to get XPFNum.
      end
    end
  end
end XPFToPF: Extracts the PF Number from an XPF Number.
Outputs: Valid and PFNum
Inputs: XPFNum
  MSIXEnable[(NUM_PFS−1):0]: Static inputs from CSRs indicating which PFs have MSI-X Capabilities enabled.
Procedure:
begin
  Valid=0; // Indicate invalid Function by default in case no match is found
  PFNum=0;
  Count=0;
  for (p=0; p<NUM_PFS; p++) begin
    if (MSIXEnable[p]) begin
      if (Count==XPFNum) begin
        Valid=1;
        PFNum=p;
      end
      Count++;
    end
  end
end XPFToXF: Determines the XF Number of a PF or XF from its XPF Number:
Output: XFNum
Inputs: XPFNum
  MSIXEnable[(NUM_PFS−1):0]: Static inputs from CSRs indicating which PFs have MSI-X Capabilities enabled.
Procedure:
begin
  if (XPFNum>=NUM_XFS) begin // Function is a PF.
    XFNum=
      2^(XF_NUM_WIDTH−1)+
      XPFToPF(XPFNum, MSIXEnable[(NUM_PFS−1): 0]);
  end
  else begin // Function is a VF, so
    XFNum=XPFNum; // XPF and XF Numbers are the same.
  end
end XPFGroupToStripingMode: Given the XPFGroupNum of an XF or PF, determines the Striping Mode.
Output: StripingMode
Inputs: XPFGroupNum
  PFCount: The number of PFs that have MSI-X Capability enabled.
begin
  Residue=NUM_XFS+PFCount−(XPFGroupNum*XF_GROUP_SIZE);
  StripingMode=0;
  for (m=REL_XF_NUM_WIDTH−1; m>0; m—) begin
    if (Residue<=(XF_GROUP_SIZE/2^m))
      StripingMode=m;
  end
end XVectorToXPF: Determines the XPF Number of the PF or XF owning an XVector.
Output: XPFNum
Inputs: XVectorNum
Procedure:
begin
  XVGroupNum=(XVectorNum/XVECTOR_GROUP_SIZE);
  XPFGroupNum=XVGroupToXPFGroup[XVGroupNum];
  StripingMode=XPFGroupToStripingMode(XPFGroupNum, PFCount);
  XPFNum=(XPFGroupNum*XF_GROUP_SIZE)+
    ((XVectorNum % XVECTOR_GROUP_SIZE) %
    (2"StripingMode));
end CSRs and Configuration: CSRs 178 (FIG. 1D) provide an interface between adapter 116 hardware and firmware. In the present disclosure, some CSRs are used to allow adapter 116 to be configured to a desired allocation of VF and MSI-X resources. These CSRs are configured before the device responds to host Configuration Requests, so that the host 102 can determine the configuration accurately when it reads the device's Configuration Registers. Typically, a boot program of an on-chip processor is used to read the values for these CSRs from a table in a non-volatile memory, and program the values into the CSRs, before it enables the adapter to respond to Configuration Requests.

The following CSR fields are used to control the SR-IOV and MSI-X resource allocation of the device:

FirstXFGroup[(NUM_PFS−1):0][(XF_NUM_WIDTH−1):0]: Array of registers, one

XF_NUM_WIDTH-bit register per PF, containing the First XF Group Number assigned to the PF specified by the first index. For PF (i), the number of XF Groups assigned is equal to (FirstXFGroup[i+1]-FirstXFGroup[i]), unless PF (i) is the highest numbered PF, in which case it has (NUM_XF_GROUPS-FirstXFGroup[i]) XF Groups assigned to it. The number of XFs allocated to PF (i) is equal to the number of XF Groups assigned to PF (i) multiplied by XF_GROUP_SIZE Programming of FirstXFGroup is restricted so that FirstXFGroup[i] is less than or equal to FirstXFGroup[i+1], and so that FirstXFGroup[NUM_PFS−1] is less than or equal to NUM_XF_GROUPS. In order to ensure that the XFToPFVF procedure works for PFs that have no VFs, any such PFs have their FirstXFGroup register programmed to the maximum unsigned value (all ones).

TotalVFs[(NUM_PFS−1):0][15:0]: Array of 16-bit registers (one register per PF) which determines the maximum supported number of VFs that the PF specified by the first index will report as TotalVFs in its SR-IOV Capability Structure (per the PCI Express Specification);

NumXVectorGroups[(NUMXPF_GROUPS 1):0][(XVECTOR_GROUP_NUM_WIDTH−1):0]:

Array of registers, one XVECTOR_GROUP_NUM_WIDTH-bit register per XPF Group, having the number of XVector Groups assigned to the XPF Group specified by the first index. The XVector Group size is the same as the XPF Group size, so the number of MSI-X vectors allocated to a VF will equal the number of XVector Groups assigned to that VF's XF Group. For each XPF Group containing PFs, each enabled PF in the XPF Group will be allocated a number of vectors equal to NumXVectorGroups[XPFNum] multiplied by 2^M, where M is the striping mode for the XPF Group. Programming of these values are restricted so that the total of NumXVectorGroup values for all XPF Groups is less than or equal to NUM_XVECTOR_GROUPS. Additionally, NumXVectorGroups should be set to the same value for all XPF Groups that are assigned to the same PF.

FirstXVectorGroup[(NUM_XPF_GROUPS−1):0][(XVECTOR_GROUP_NUM_WIDTH−1): 0]:

This is a lookup table that is automatically generated by hardware from the programmed values in the NumXVectorGroups array. FirstXVectorGroup[0] is always 0. For each XPF Group n (n>0), FirstXVectorGroup[n] is given by (FirstXVectorGroup[n−1]+NumXVectorGroups [n−1]).

XVGroupToXPFGroup[(NUM_XVECTOR_GROUPS−1):0][(XPF_GROUP_NUM_WIDTH−1):0]: This is a lookup table that is automatically generated by hardware from the programmed values in the NumXVectorGroups array. The procedure for generating the table is as follows:

```
begin
  for (g=0; g<NUM_XVECTOR_GROUPS; g++) begin
    // Default: all bits set to one to indicate unassigned
      XVector Group:
      XVGroupToXPFGroup[g]=2^XPF_GROUP_NUM_WIDTH−1;
    for (h=0; h<(NUM_XF_GROUPS+NUM_PF_GROUPS); h++) begin
      if (FirstXVectorGroup[h]<=g) begin
        XPFGroupNum[g]=h;
      end
    end
  end
end
```

MSIXEnable[(NUM_PFS−1):0]: One bit per PF to indicate whether the PF is allowed to use MSI-X. Note that VFs will be allowed to use MSI-X, regardless of the state of the parent PF's MSIXEnable bit, if they belong to an XF Group that has NumXVectorGroups set to a number greater than 0.

PFMSIXTableSize[(NUM_PFS−1):0][10:0]: Array of registers, one 11-bit register per PF, containing the value that will be reported in the Table Size field of the MSI-X Capability Structure of the PF specified in the first index.

Due to the definition of Table Size in the PCIe Specifications, the value is one less than the actual number of MSI-X vectors that the Function supports, as determined by the setting of NumXVectorGroups and the Striping Mode associated with the PF's XPF Group.

VFMSIXTableSize[(NUM_PFS−1):0][10:0]: Array of registers, one 11-bit register per PF, containing the value that will be reported in the Table Size field of the MSI-X Capability Structure of every VF of the PF specified by the first index. The value is one less than the actual number of MSI-X vectors that each VFs of the PF support, as determined by the setting of NumXVectorGroups.

The above description presents the best mode contemplated for carrying out the present embodiments, and of the manner and process of making and using them, in such full, clear, concise, and exact terms as to enable any person skilled in the art to which they pertain to make and use these embodiments. These embodiments are, however, susceptible to modifications and alternate constructions from that discussed above that are fully equivalent. For example, the embodiments disclosed herein are applicable to any peripheral device and are not limited to any particular adapter type. Consequently, these embodiments are not limited to the particular embodiments disclosed. On the contrary, these embodiments cover all modifications and alternate constructions coming within the spirit and scope of the embodiments as generally expressed by the following claims, which particularly point out and distinctly claim the subject matter of the embodiments.

What is claimed is:

1. A device, comprising:
    a physical function (PF) representing a physical hardware component of the device is assigned to at least a group that includes a minimum number of virtual functions (VFs) that are associated with the PF and are used to access the PF, where each VF is identified by a unique identification number; wherein a number of groups that are assigned to the PF is configurable depending on the function of the physical component; wherein the group is part of an array that is indexed by a group number and a relative number and the group number is determined by a transformation operation using a PF number and a VF number.

2. The device of claim 1, wherein the device is a PCI-Express device that is operationally coupled with a computing device.

3. The device of claim 2, wherein the PCI-Express device is a host bus adapter used for input/output operations.

4. The device of claim 1, wherein each group is assigned to a vector group having a certain number of vectors that are used by the PF to generate an interrupt.

5. The device of claim 4, wherein the vector group has a fixed number of vectors.

6. The device of claim 1, wherein each group has a fixed number of VFs.

7. The device of claim 1, wherein each group has a variable number of VFs.

8. A PCI-Express device coupled to a computing device, comprising:
- a physical function (PF) representing a physical hardware component of the device is assigned to at least a group that includes a minimum number of virtual functions (VFs) that are associated with the PF and are used to access the PF, where each VF is identified by a unique identification number; wherein a number of groups that are assigned to the PF is configurable depending on the function of the physical component;
- wherein the group is assigned to a vector group having a certain number of vectors that are used by the PF to generate an interrupt; and
- wherein the group is part of an array that is indexed by a group number and a relative number; and the group number is determined by a transformation operation using a PF number and a VF number.

9. The device of claim 8, wherein the group has a fixed number of VFs.

10. The device of claim 8, wherein the device is a host bus adapter used for input/output operations.

\* \* \* \* \*

UNITED STATES PATENT AND TRADEMARK OFFICE
CERTIFICATE OF CORRECTION

| | | |
|---|---|---|
| PATENT NO. | : 9,047,208 B1 | Page 1 of 1 |
| APPLICATION NO. | : 14/100856 | |
| DATED | : June 2, 2015 | |
| INVENTOR(S) | : Moore et al. | |

It is certified that error appears in the above-identified patent and that said Letters Patent is hereby corrected as shown below:

In The Specification

In column 1, line 51, after "of" delete "a".

In column 2, line 37, delete "term"machine-readable" and insert -- term "machine-readable --, therefor.

In column 3, line 25, delete "1.12" and insert -- 112 --, therefor.

In column 4, line 50, delete "an"address"" and insert -- an "address" --, therefor.

In column 4, line 51, delete "a"length"" and insert -- a "length" --, therefor.

In column 4, line 63, delete "process" and insert -- process. --, therefor.

In column 10, line 31, delete "SIZE" and insert -- SIZE. --, therefor.

In column 11, line 28, delete "GROUPNUM" and insert -- GROUP_NUM --, therefor.

In column 12, line 17, delete "SIZE" and insert -- SIZE. --, therefor.

In column 13, line 29, delete "PF" and insert -- 4 --, therefor.

In column 13, line 37, delete "559" and insert -- 559. --, therefor.

In column 18, line 56, delete "reorting" and insert -- reporting --, therefor.

In column 19, line 39, delete "XEroor" and insert -- XError --, therefor.

In column 19, lines 49-50, delete "Error Logged" and insert -- term ErrorLogged --, therefor.

In column 25, line 24, delete "SIZE" and insert -- SIZE. --, therefor.

Signed and Sealed this
Seventeenth Day of November, 2015

Michelle K. Lee
*Director of the United States Patent and Trademark Office*